US011866136B2

United States Patent
Kuehmichel et al.

(10) Patent No.: US 11,866,136 B2
(45) Date of Patent: *Jan. 9, 2024

(54) WATERCRAFT AND ASSOCIATED PEDAL DRIVE SYSTEM

(71) Applicant: Johnson Outdoors Inc., Racine, WI (US)

(72) Inventors: Blaine G. Kuehmichel, Wausau, WI (US); Timothy A. Bragg, Winterport, ME (US)

(73) Assignee: Johnson Outdoors Inc., Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,147

(22) Filed: Dec. 22, 2022

(65) Prior Publication Data

US 2023/0174210 A1  Jun. 8, 2023

Related U.S. Application Data

(63) Continuation of application No. 17/028,415, filed on Sep. 22, 2020, now Pat. No. 11,572,143.

(60) Provisional application No. 63/005,931, filed on Apr. 6, 2020, provisional application No. 62/988,762, filed on Mar. 12, 2020.

(51) Int. Cl.
*B63H 16/20* (2006.01)
*B63H 23/12* (2006.01)
*B60L 50/20* (2019.01)
*F16D 41/22* (2006.01)

(52) U.S. Cl.
CPC ............. *B63H 16/20* (2013.01); *B60L 50/20* (2019.02); *B63H 23/12* (2013.01); *F16D 41/22* (2013.01); *B63H 2016/202* (2013.01)

(58) Field of Classification Search
CPC .. B63H 16/20; B63H 23/12; B63H 2016/202; B60L 50/20; F16D 41/22; B63B 34/20; B63B 34/26; B62M 6/55
See application file for complete search history.

(56) References Cited

U.S. PATENT DOCUMENTS

| | | |
|---|---|---|
| 1,121,955 A | 12/1914 | Tracy |
| 2,091,269 A | 8/1937 | Colman |
| 5,362,264 A | 11/1994 | Parant |
| 5,758,736 A | 6/1998 | Yamauchi |
| 5,938,489 A | 8/1999 | McNeil |
| 6,171,157 B1 | 1/2001 | Knapp |
| 6,210,242 B1 | 4/2001 | Howard et al. |
| 6,855,016 B1 | 2/2005 | Jansen |
| 7,021,978 B2 | 4/2006 | Jansen |

(Continued)

FOREIGN PATENT DOCUMENTS

| | | |
|---|---|---|
| CA | 2087736 A1 | 4/1994 |
| CA | 2192860 A1 | 6/1998 |

(Continued)

*Primary Examiner* — Andrew Polay
(74) *Attorney, Agent, or Firm* — Reinhart Boerner Van Deuren P.C.

(57) ABSTRACT

A watercraft and associated pedal drive system are provided. Method of operating the pedal drive are also provided. The pedal drive system allows for unassisted manual pedaling to provide thrust to the watercraft. The pedal drive system also provides on demand pedal assistance of varying levels via an assist drive train having an electric motor to supplement the manual pedal force input provided by a user at the pedals of pedal drive system.

20 Claims, 25 Drawing Sheets

(56) References Cited

U.S. PATENT DOCUMENTS

| | | |
|---|---|---|
| 7,530,867 B2 | 5/2009 | Jackson |
| 7,549,902 B2 | 6/2009 | Jansen |
| 8,342,897 B2 | 1/2013 | Gater et al. |
| 8,529,306 B2 | 9/2013 | Baldwin |
| 8,753,156 B2 | 6/2014 | Ketterman et al. |
| 9,248,897 B2 | 2/2016 | Shields |
| 9,290,233 B2 | 3/2016 | Goin |
| 9,302,755 B2 | 4/2016 | Wolfe |
| 9,359,056 B2 | 6/2016 | Lyons et al. |
| 9,428,255 B2 | 8/2016 | Santa Catarina |
| 9,463,857 B1 | 10/2016 | Schiller et al. |
| 9,475,559 B2 | 10/2016 | Czarnowski et al. |
| 9,623,944 B2 | 4/2017 | Kuehmichel et al. |
| 9,701,367 B2 | 7/2017 | McDonough et al. |
| 9,725,149 B2 | 8/2017 | Kiffmeyer et al. |
| 9,731,802 B2 | 8/2017 | Ketterman et al. |
| 9,738,362 B2 | 8/2017 | Ketterman et al. |
| 9,758,220 B1 | 9/2017 | Zimmerman et al. |
| 9,834,285 B2 | 12/2017 | Orenes Lopez |
| 9,914,519 B2 | 3/2018 | Nutz et al. |
| 9,981,726 B2 | 5/2018 | Ketterman et al. |
| 9,981,727 B2 | 5/2018 | Shields |
| 9,988,133 B2 | 6/2018 | Murphy |
| 10,005,531 B1 | 6/2018 | Broadway et al. |
| 10,124,873 B2 | 11/2018 | Aguirre |
| 10,150,544 B2 | 12/2018 | Schibli |
| 10,458,788 B2 | 10/2019 | Fyfe et al. |
| 10,538,301 B2 | 1/2020 | Murphy |
| 11,148,775 B2 | 10/2021 | Kuehmichel |
| 2002/0142679 A1 | 10/2002 | Ibata et al. |
| 2002/0195039 A1 | 12/2002 | Anderson |
| 2008/0200079 A1 | 8/2008 | Jansen |
| 2012/0238159 A1 | 9/2012 | Palvoelgyi et al. |
| 2013/0206540 A1 | 8/2013 | Wang |
| 2015/0210364 A1 | 7/2015 | Choi |
| 2018/0009515 A1 | 1/2018 | Murphy |
| 2018/0265179 A1 | 9/2018 | Shields |
| 2021/0061429 A1 | 3/2021 | Kuehmichel |
| 2021/0107603 A1 | 4/2021 | Howard-Willis et al. |
| 2021/0229790 A1 | 7/2021 | Cloutier et al. |
| 2021/0284309 A1 | 9/2021 | Kuehmichel et al. |
| 2022/0033045 A1 | 2/2022 | Kuehmichel |

FOREIGN PATENT DOCUMENTS

| | | |
|---|---|---|
| CA | 2209047 A1 | 1/1999 |
| EP | 2666708 A2 | 11/2013 |
| WO | WO 2012/094686 A2 | 7/2012 |
| WO | WO 2019/016419 A1 | 1/2019 |

WATERCRAFT AND ASSOCIATED PEDAL DRIVE SYSTEM

CROSS-REFERENCE TO RELATED PATENT APPLICATIONS

This patent application is a continuation of U.S. patent application Ser. No. 17/028,415, filed Sep. 22, 2020, which is now pending, which claims the benefit of U.S. Provisional Patent Application No. 62/988,762, filed Mar. 12, 2020, and U.S. Provisional Patent Application No. 63/005,931, filed Apr. 6, 2020, the entire teachings and disclosures each of which are incorporated herein by reference thereto.

FIELD OF THE INVENTION

This invention generally relates to marine technology, and more particularly watercraft, and even more particularly to pedal drives used in watercraft applications.

BACKGROUND OF THE INVENTION

Recreational watercraft such as kayaks have become increasingly popular for recreational activities. Kayakers have typically used a paddle to propel the kayaks. Unfortunately, many people cannot paddle a kayak for long distances or at all due to various physical conditions. Further, currents in the water, wakes from other watercraft, etc., can make paddling a challenging process even for the fit enthusiast.

Further, if a person is using the kayak to fish, paddling becomes a limitation of the kayak as the kayaker typically must use both hands to paddle the kayak and thus cannot hold the fishing pole or operate any fishing related equipment. It has become very popular to fish from kayaks as a kayak can be maneuvered into many areas that a typical boat for fishing cannot. Due to the benefits of the maneuverability of the kayak many fishermen who would not otherwise use a kayak have become drawn to their use. Some of these fishermen would prefer a method to reduce the amount of paddling required to get to and from their fishing spot, but do not want to lose the shallow water capabilities of a traditional kayak.

In view of the above, there has been a trend in recent years to utilize additional componentry on the kayak to avoid the need for paddling the kayak, or at least reduce the amount of paddling necessary. An example of such componentry is the use of pedal drives in the context of kayaks and the like. Such pedal drives can take on a variety of forms. For example, such pedal drives may operate as a traditional bicycle type pedal, or as a more customized configuration where pedaling is essentially a linear motion. In either case, the pedaling force provided is mechanically converted to an output at a propeller or similar device used to provide thrust to the kayak in the water. Such configurations advantageously remove the necessity to hold a paddle.

Despite the above advantages, such pedal drive systems still require a significant power input from the user, albeit with their legs instead of their arms. As such, there remain instances where the typical pedal drive configuration is not ideal. For example, in high wind and/or high current conditions water pedaling can become difficult and exerting. As another example, pedaling for a long distance can be very exerting. To address the above, some pedal drive watercraft designs now incorporate some type of electro-mechanical device to supplement the pedaling force provided by the user.

For example, U.S. Pat. No. 9,988,133 to Murphy titled, "Integral Pedal Drive for a Watercraft" the teachings and disclosure of which are incorporated by reference in their entirety herein, discloses a pedal drive system that allows a user to pedal manually, or alternatively, for a motor to provide the power input that would otherwise be provided at the pedals. In other words, this system only allows for entirely manual power input or entirely motor power input.

As another example, U.S. Patent Application Publication No. 2012/0238159 to Palvoelgyi et al. titled, "Combination Manually Driven and Motor Driven Watercraft" the teachings and disclosure of which are incorporated by reference in their entirety herein, discloses a system wherein pedals and a motor can provide power inputs to provide thrust to the watercraft. As yet another example, U.S. Pat. No. 7,549,902 to Jansen titled, "Electric Motor Assisted Propulsion System For Human-Powered Watercraft" the teachings and disclosure of which are incorporated by reference in their entirety herein, discloses a system wherein a motor is coupled to the mechanical pedal drive of the system, and the amount of assistance provided by the motor can be selected.

As such, there is a need in the art for a watercraft and associated pedal drive system that allows a user to pedal efficiently in calm and rough water, and over long distances.

BRIEF SUMMARY OF THE INVENTION

The present application provides improvements over the current state of the art. In a particular embodiment, a new and improved pedal drive system is provided. In a more particular embodiment, a new and improved pedal drive system that can be operated in a manual mode and an assist mode is provided.

In some embodiments, in the manual mode, the operator provides all of the input force for powering the pedal drive system. In the assist mode, the operator and an assist drive train combine to power the system. In one implementation, electronic controls are designed such that the electric assist will not drive the crankshaft faster than the pedaling rate of the operator. However, the controls can be configured such that the load can be entirely on the assist system provided that the operator pedals at a constant rate and the total load is less than the amount of drive assist preset by the operator. If the operator reduces pedaling rate, the assist power reduces to provide the power need to match the operator's input speed. As such, if the operator slows the assist system slows. If the operator stops, the assist system stops. However, if the operator pedals faster than the assist drive load preset, the operator's percentage of the load increases with increased pedaling rate once the assist drive's power output has reached the preset/maximum level.

Therefore, the operator can increase boat speed by adding input power or reducing boat speed by reducing pedaling speed. This can be done without any changes to the control presets of the assist drive and controller.

For example, if the controller is set to provide the necessary power for up to 2 mph of boat speed if the operator pedals at that rate of speed, the assist system can provide up to that level of power/thrust. In such a situation, the assist system may provide 95% of the thrust and the ratio of assist system load to operator load would be 19:1. However, if the operator increases the pedaling rate to reach 4 mph, the assist drive train will only add the power to provide 2 mph so the operator's input must increase and the ratio of assist to operator power inputs will significantly decrease, such as for example to 1:2.5.

In an embodiment, a pedal drive system for a watercraft including a manual drive train, an assist drive train, a thrust unit and a coupling arrangement is provided. The manual drive train includes a pair of pedals mechanically attached to a crankshaft for rotation of the crankshaft about a crankshaft axis. The assist drive train has a motor. The thrust unit has a propeller. The coupling arrangement has a manual mode and an assist mode. The coupling arrangement includes a coupler that is slideable along the crankshaft axis to transition the coupling arrangement between the manual mode and the assist mode. In the manual mode, the coupler mechanically couples the crankshaft to the thrust unit such that rotation of the crankshaft in a first angular direction about the crankshaft axis drives the thrust unit to output thrust in a first thrust direction and rotation of the crankshaft in a second angular direction, opposite the first angular direction, about the crankshaft axis drives the thrust unit to output thrust in a second thrust direction, opposite the first thrust direction. In the assist mode, the coupling arrangement couples the crankshaft to the thrust unit such that rotation of the crankshaft in the first angular direction about the crankshaft axis drives the thrust unit to output thrust in the first thrust direction and rotation of the crankshaft in the second angular direction about the crankshaft axis does not drive the thrust unit to output thrust in the second thrust direction. In the assist mode, the assist drive train is mechanically connected to the thrust unit such that when the motor is energized, the assist drive train drives the thrust unit to output thrust in the first thrust direction.

In one embodiment, the assist drive train includes a first gear mounted for rotation about the crankshaft axis. The thrust unit has a second gear. In the assist mode, the coupler connects the first gear to the second gear. In the manual mode, the coupler connects the crankshaft to the second gear.

In one embodiment, in the assist mode, the coupler is disengaged from the crankshaft and engaged with the first gear to transfer torque therebetween. In the manual mode, the coupler is disengaged from the first gear and engaged with the crankshaft to transfer torque therebetween.

In one embodiment, the assist drive train includes a first gear mounted for rotation about the crankshaft axis. The first gear includes a first torque transfer arrangement. The crankshaft has a second torque transfer arrangement. The thrust unit has a second gear that has a third torque transfer arrangement. The coupler includes a fourth torque transfer arrangement and a fifth torque transfer arrangement. The fourth torque transfer arrangement engages with the third torque transfer arrangement of the second gear to transfer torque between the coupler and the first gear in both angular directions about the crankshaft axis in both the manual and assist modes. The fifth torque transfer arrangement engages with the first torque transfer arrangement of the first gear to transfer torque between the coupler and the first gear about the crankshaft axis when the coupling arrangement is in the assist mode such that the assist drive train can drive the thrust unit. The fifth torque transfer arrangement engages with the second torque transfer arrangement of the crankshaft to transfer torque between the coupler and the crankshaft in both directions about the crankshaft axis when the coupling arrangement is in the manual mode such that the manual drive train can drive the thrust unit.

In one embodiment, the first and fourth torque transfer arrangements remain engaged when the coupler slides axially along the crankshaft axis to transition between the manual and assist modes.

In one embodiment, a one-way clutch is interposed between the second gear and the crankshaft. The one-way clutch transfers torque between the crankshaft and the second gear when the crankshaft is rotated in the first angular direction to drive the thrust unit to output thrust in the first thrust direction while the coupling arrangement is in the assist mode. The one-way clutch prevents torque transfer between the crankshaft and the second gear when the crankshaft is rotated in the second angular direction while the coupling arrangement is in the assist mode.

In one embodiment, the one-way clutch allows the assist drive train to overrun the crankshaft when the coupling arrangement is in the assist mode, e.g. when the motor is operating faster than the user is pedaling.

In one embodiment, the coupling is a collar that extends around the crankshaft.

In one embodiment, the coupling arrangement includes an electromechanical coupling actuator that drives the coupling along the crankshaft axis to transition the coupling arrangement between the manual mode and the assist mode.

In one embodiment, the electromechanical coupling actuator includes a solenoid and a pivot lever interposed between the solenoid and the coupling. The pivot lever is driven by the solenoid to pivot between a first orientation corresponding to the assist mode and a second orientation corresponding to the manual mode.

In one embodiment, the pivot lever includes a C-shaped fork end that pivotally engages the coupler.

In one embodiment, the coupler is engaged with the crankshaft to rotate with the crankshaft about the crankshaft axis when the coupling arrangement is in both the assist mode and manual mode.

In one embodiment, the thrust unit has a first gear that rotates about the crankshaft axis. The coupler is selectively engaged with and disengaged from the first gear. In the manual mode, the coupler engages the first gear and connects the crankshaft to the first gear such that the first gear rotates with the crankshaft when the crankshaft is rotated in both the first and second angular directions. In the assist mode, the coupler is disengaged from the first gear such that rotation of the crankshaft in either of the first or second angular directions does not transfer torque to the first gear through the coupler.

In one embodiment, a one-way clutch is interposed between the first gear and the crankshaft. Rotation of the crankshaft in the first angular direction drives the first gear through the one-way clutch and rotation of the crankshaft in the second angular direction does not drive the first gear through the one-way clutch.

In one embodiment, the coupling arrangement includes an electromechanical coupling actuator that drives the coupling between first and second positions along the crankshaft axis to transition between the manual mode and the assist mode. The first position corresponds to the coupling arrangement being in the manual mode and the second position corresponds to the assist mode.

In one embodiment, the coupling arrangement includes a biasing member biasing the coupler toward the first position. The coupling actuator is an electromagnet. The electromagnet translates the coupler along the crankshaft axis from the first position to the second position upon energization.

In one embodiment, a one-way clutch is mechanically interposed between the motor and the first gear. When the coupling arrangement is in the manual mode, rotation of the crankshaft in the second direction prevents driving the motor in a direction opposite the motor is driven when the coupling arrangement is in the assist mode and the motor is energized to drive the thrust unit to output thrust in the first thrust direction.

In one embodiment, the coupler has a first axial end face that axially faces the first gear along the crankshaft axis. The first gear has a second axial end face that axially faces the coupler along the crankshaft axis. A plurality of dogs, also referred to as keys, are formed into one of the first and second end faces. A plurality of dog receiving slots (also referred to as key receiving slots) are formed into the other one of the first and second end faces sized to axially receive and angularly engage the dogs to transfer torque between the coupler and the first gear when the coupling arrangement is in the manual mode.

In an embodiment, a watercraft is provided. The watercraft includes a hull and a pedal drive system according to any combination of the embodiments outlined above mounted to the hull.

Methods of operating a pedal drive as outlined above are provided.

In one embodiment, a method of operating a pedal drive system of a watercraft is provided. The method includes transitioning between a manual mode and an assist mode by sliding a coupler of a coupling arrangement along a crankshaft axis defined by a crankshaft of a manual drive train. In the manual mode, the coupler mechanically couples the crankshaft to the thrust unit such that rotation of the crankshaft in a first angular direction about the crankshaft axis drives a propeller of the thrust unit to output thrust in a first thrust direction and rotation of the crankshaft in a second angular direction, opposite the first angular direction, about the crankshaft axis drives the thrust unit to output thrust in a second thrust direction, opposite the first thrust direction. In the assist mode, the coupling arrangement couples the crankshaft to the thrust unit such that rotation of the crankshaft in the first angular direction about the crankshaft axis drives the thrust unit to output thrust in the first thrust direction and rotation of the crankshaft in the second angular direction about the crankshaft axis does not drive the thrust unit to output thrust in the second thrust direction. In the assist mode, the assist drive train is mechanically connected to the thrust unit such that when a motor of the assist drive train is energized, the assist drive train drives the thrust unit to output thrust in the first thrust direction.

In one method, the assist drive train includes a first gear mounted for rotation about the crankshaft axis. The thrust unit has a second gear. The method includes transitioning to the assist mode by coupling the first gear to the second gear with the coupler by sliding the coupler along the crankshaft axis. The method also includes transitioning to the manual mode by coupling the crankshaft to the second gear with the coupler by sliding the coupler along the crankshaft axis.

In one method, transitioning to the assist mode includes disengaging the coupler from the crankshaft and engaging the coupler with the first gear to transfer torque between the first gear and the second gear. Also, transitioning to the manual mode includes disengaging the coupler from the first gear and engaging the coupler with the crankshaft to transfer torque between the crankshaft and the second gear.

In one method, the assist drive train includes a first gear mounted for rotation about the crankshaft axis. The first gear includes a first torque transfer arrangement. The crankshaft has a second torque transfer arrangement. The thrust unit has a second gear that has a third torque transfer arrangement. The coupler includes fourth and fifth torque transfer arrangements. The method includes engaging the third torque transfer arrangement with the fourth torque transfer arrangement in both the manual mode and the assist mode to transfer torque between the coupler and the first gear in both angular directions about the crankshaft axis in both the manual mode and assist mode. The method includes transitioning to the assist mode by engaging the fifth torque transfer arrangement with the first torque transfer arrangement of the first gear to transfer torque between the coupler and the first gear about the crankshaft axis such that the assist drive train can drive the thrust unit. The method includes transitioning to the manual mode by engaging the fifth torque transfer arrangement with the second torque transfer arrangement of the crankshaft to transfer torque between the coupler and the crankshaft in both directions about the crankshaft axis such that the manual drive train can drive the thrust unit to produce thrust in both the first and second thrust directions.

In one method, the method includes driving the thrust unit to output thrust in the first thrust direction while the coupling arrangement is in the assist mode by transferring torque between the crankshaft and the second gear, with a one-way clutch between the second gear and the crankshaft, by rotating the crankshaft in the first angular direction. The method includes preventing torque transfer between the crankshaft and the second gear, with the one-way clutch, when the crankshaft is rotated in the second angular direction while the coupling arrangement is in the assist mode.

One method includes driving the coupler to transition the coupling arrangement between the manual mode and the assist mode with an electromechanical coupling actuator.

In one method, the method includes engaging the coupler with the crankshaft to rotate with the crankshaft about the crankshaft axis in both the assist mode and manual mode.

One method includes transitioning to the manual mode by engaging a first gear of the thrust unit that rotates about the crankshaft axis with coupler to connect the crankshaft to the first gear such that the first gear rotates with the crankshaft when the crankshaft is rotated in both the first and second angular directions. The method also includes transitioning to the assist mode by disengaging the coupler from the first gear such that rotation of the crankshaft in either of the first or second angular directions does not transfer torque to the first gear through the coupler.

In one method, the method includes driving the first gear through a one-way clutch interposed between the first gear and the crankshaft by rotating the crankshaft in the first angular direction. The method includes preventing driving of the first gear through the one-way clutch when the crankshaft is rotated in the second angular direction.

One method includes driving the coupling, with an electromechanical coupling actuator, between first and second positions along the crankshaft axis to transition between the manual mode and the assist mode. The first position corresponds to the coupling arrangement being in the manual mode and the second position corresponds to the assist mode.

One method includes biasing the coupler, with a biasing member of the coupling arrangement, toward the first position, the coupling actuator is an electromagnet. The method includes translating the coupler along the crankshaft axis from the first position to the second position with the coupling actuator upon energization of the coupling actuator. The coupling actuator may optionally be an electromagnet.

In one method, when the coupling arrangement is in the manual mode, the method includes preventing, with a one-way clutch mechanically interposed between the motor and the first gear, driving the motor in a direction opposite a direction the motor is driven when the coupling arrangement is in the assist mode and the motor is energized to drive the thrust unit to output thrust in the first thrust direction, when the crankshaft is rotated in the second angular direction or at a reduced rate Further, the one-way clutch allows the operator to reduce pedaling rate and without being driven by the motor. Here, the controller senses the reduction in pedaling rate via an rpm sensor. The controller then reduces the assist power input to match the new pedaling rate. It is a benefit that no torque sensor is needed with this configuration and control scheme. The controller simply watches the pedaling speed of the operator.

In one method, the coupler has a first axial end face that axially faces the first gear. The first gear has a second axial end face that axially faces the coupler. A plurality of dogs are formed into one of the first and second end faces. A plurality of dog receiving slots are formed into the other one of the first and second end faces sized to axially receive and angularly engage the dogs to transfer torque between the coupler and the first gear when the coupling arrangement is in the manual mode.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
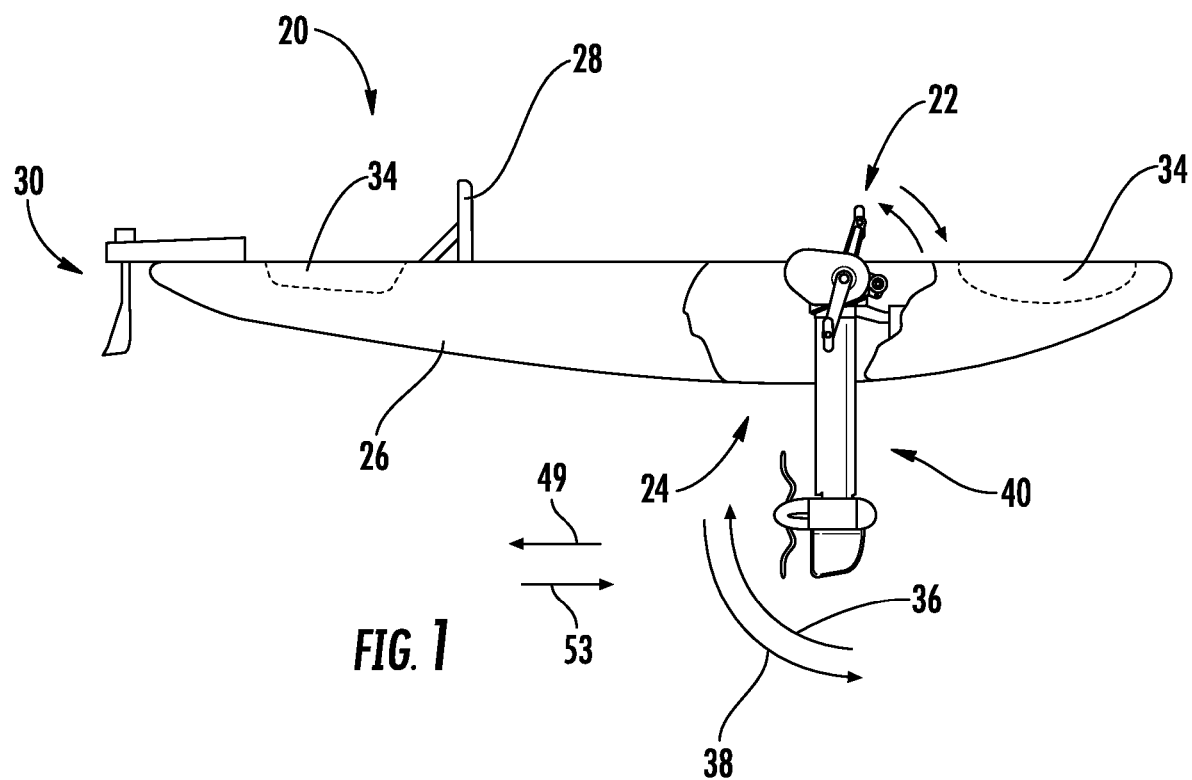
FIG. 1 is a simplified illustration of a watercraft including a pedal drive system according to the application.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, the same illustrate an exemplary embodiment of a watercraft 20 and an associated pedal drive system 22 constructed in accordance with the teachings herein. As will be explained in greater detail below, pedal drive system 22 can be operated in a manual mode or an assist mode. The manual mode allows for unassisted manual pedaling to provide thrust to watercraft 20.

In the assist mode, pedal drive system 22 also provides on demand pedal assistance of varying levels via an assist drive train having an electric motor to supplement the manual pedal force input provided by a user at the pedals of pedal drive system 22.

In an embodiment, in the manual mode, the assist drive train of the pedal drive system 22 is disconnected from the remainder of the system when not providing any pedal assist force to minimize the amount of additional manual pedal force beyond that required by traditional pedal drive systems that do not include any type of assist functionality.

As mentioned above, pedal drive system 22 provides on demand pedal assist force of varying levels. In operation, the user turns the system on using a user interface described below. The user can select a level of assistance using this interface. Once the user begins pedaling forward, the assist drive train engages, and begins providing pedal assist force to ultimately reduce the amount of manual pedal force necessary for a given amount of thrust, while not changing the pedaling speed. Indeed, pedal drive system 22 utilizes one or more overrunning clutches to permit pedaling faster than the pedaling speed provided.

The system may be configured to monitor and change the amount of pedal assist force provided based on the manual pedal force provided by the user. For example, if the user's pedaling speed drops below a preset pedaling speed at a given level of assistance, the system can automatically reduce the amount of pedal assist force provided to match the new pedaling speed.

The system may also be configured to automatically disengage the assist drive train so as to stop providing pedal assist force if the user stops pedaling entirely. In such an instance, the user can then freely pedal backwards, without back-driving the entirety of the assist drive train of pedal drive system 22, for example to slow the forward motion of watercraft 20. If the user then resumes pedaling forward, the system may also automatically begin providing pedal assist force again by automatically detecting forward motion of the pedals, and then re-engaging the assist drive train. These and other functions of pedal drive system 22 are described in the following.

With particular reference now to FIG. 1, watercraft 20 may take the form of any type of kayak or other similar watercraft (e.g. a canoe). In the exemplary embodiment watercraft 20 can include an opening 24 in its hull 26 to allow a portion of pedal drive system 22 to extend below a bottom of hull 26 and provide thrust to watercraft that is converted from the manual pedal force and/or the pedal assist force provided by a user and/or pedal drive system 22.

Indeed, a user (not shown) may be seated in seat 28 and operate pedal drive system 22 as well as any steering controls as mentioned in the following.

Further, hull 26 may include one or more sealed or open top storage compartments 34.

Watercraft 20 can include a rudder system 30 and associated manual or automated controls to steer watercraft 20. The particular shape and size of watercraft 20 illustrated is purely exemplary and not limiting in any way on the invention herein. Further, the location, size, and shape of pedal drive system 22 relative to hull 26 is purely exemplary. For example, the portion of the pedal drive system 22 that extends into the water could be located where the rudder system 30 is located in some embodiments, replacing the need for rudder system 30.

It is envisioned that pedal drive system 22 may be incorporated into any watercraft where it may be desirable to include user pedal functionality.

Pedal drive system 22 may also be mounted to hull 26 such that it is movable generally in directions 36, 38 to selectively stow and deploy pedal drive system 22. To place pedal drive system 22 in a stowed position, pedal drive system 22 may be rotated in direction 36 such that it is generally stowed within opening 24 and does not extend downwardly through opening 24 as shown. To place pedal drive system 22 in a deployed position, the same may be rotated in direction 38 to place it generally in the illustrated configuration. Further, pedal drive system 22 may be rotated in direction 36 to completely remove it from hull 26. As such, appropriate seals and other structure may be employed so as to appropriately seal opening 24 when pedal drive system 22 is or is not present to reduce or eliminate the ingress of water into the interior of hull 26. However, such seals are not necessary for all watercraft.

Figure 2:
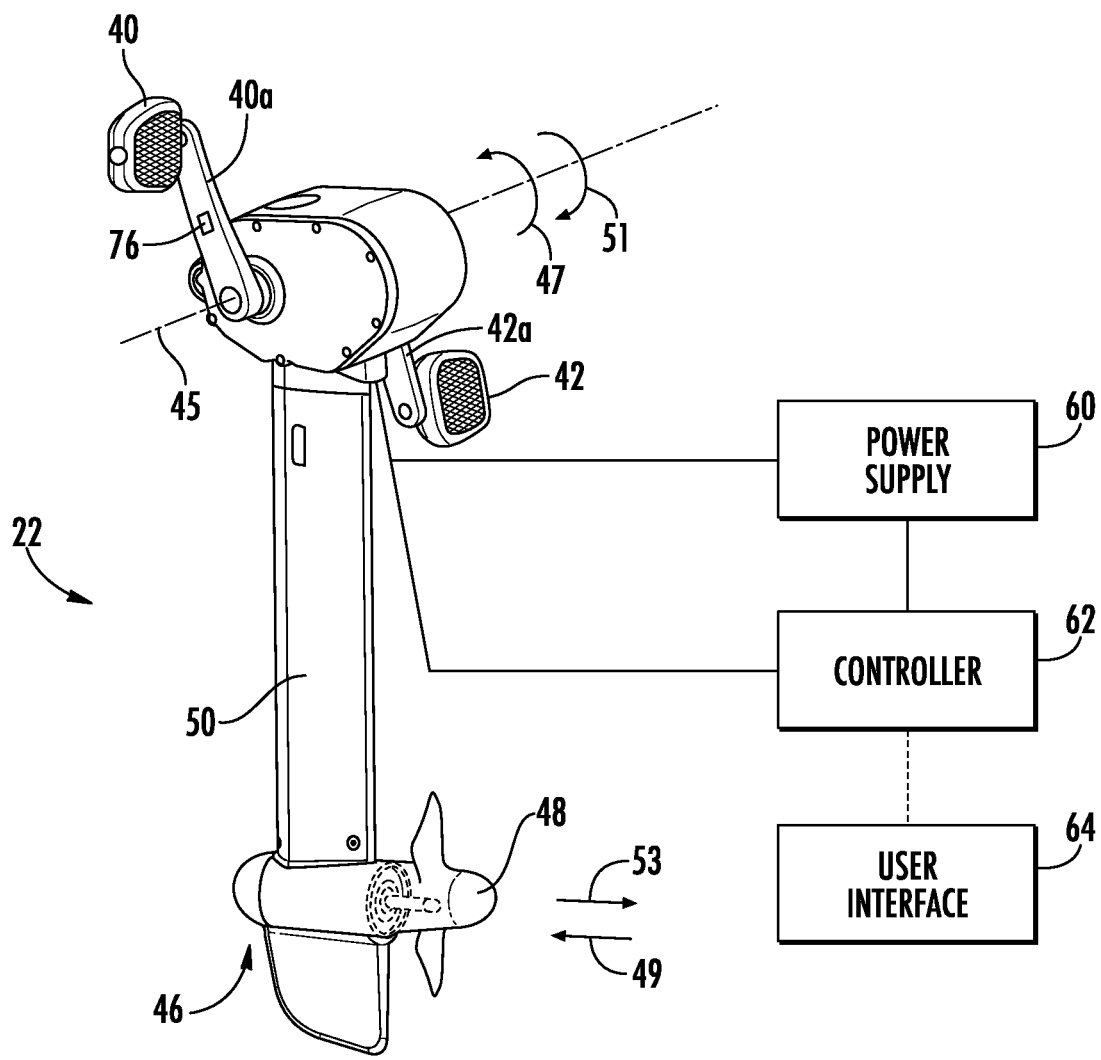
FIG. 2 is a pedal drive system for use with the watercraft.

Turning now to FIG. 2, pedal drive system 22 is removed from watercraft 20. Pedal drive system 22 includes a pair of pedals 40, 42 where a user can provide manual pedal force input. Each pedal includes an associated crank 40a, 42a, respectively, which are mounted to a rotatable crankshaft 44 defining a crankshaft axis 45 extending longitudinally through shaft 44.

Rotation of the crankshaft 44 in a first angular direction 47 about crankshaft axis 45 creates a thrust force via propeller 48 in a first thrust direction 49 while rotation of the crankshaft 44 in a second angular direction 51, opposite the first angular direction 47, creates a thrust force via propeller 48 in a second thrust direction 53, opposite the first thrust direction 49.

Pedal drive system 22 also includes an assist drive train 52 for providing, via an electric motor, pedal assist force. A power supply 60 is associated with an electric motor 66 of assist drive train 52 and provides electrical power thereto. Power supply 60 may also provide power to a controller 62, the latter of which is utilized to monitor and control the operation of pedal drive system 22 based in part on inputs provided by a user interface 64. Power supply 60 may be any power source used in watercraft applications and, for non-limiting example, may be a marine battery.

Controller 62 may be a stand-alone controller housed within housing 50 or elsewhere on watercraft 20, and include all the necessary hardware, firmware, and software necessary for achieving the functionality described herein. Alternatively, controller 62 may be integrated into another device. For example, controller 62 may be integrated into a multi-function device e.g. a fish finder, a mobile device, or any other device readily available to the user which can receive inputs and send outputs. The term "integrated" in the foregoing includes not only combining the physical structure of controller 62 into such devices, but also includes embodying controller 62 entirely as a software program run on such devices. Indeed, many multi-function displays and mobile devices are fully capable of receiving inputs and sending outputs, and as such, it is entirely possible to utilize the existing hardware of such devices to operate as controller 62.

Controller 62 may communicate with pedal drive system 22 using a wired or wireless connection. In the case of a wireless connection, pedal drive system 22 can also include its own local hardware, software, and firmware necessary to communicate with such a remotely located controller 62 and respond to commands from controller 62. In addition to controlling the operation of the assist functionality of pedal drive system 22, controller 62 may also control other aspects of the system such as battery life and power consumption.

Further, controller 62 can receive inputs relating to the operation of pedal drive system 22, so as to control the assist functionality provided thereby. For example, a torque sensor may be mounted to one or both of cranks 40a, 42a, and be in communication with controller 62. Alternatively, torque sensor may be mounted to any structure of pedal drive system 22 where it can sense a torque loading. Additionally or in the alternative to a torque sensor, a speed sensor may be used to, for example, monitor the revolutions per minute thereof. This speed sensor may also be in communication with controller 62. The torque and speed sensors may communicate via a wired or wireless connection with controller 62, and allow controller 62 to detect pedal 40, 42 speed and direction.

Figure 3:
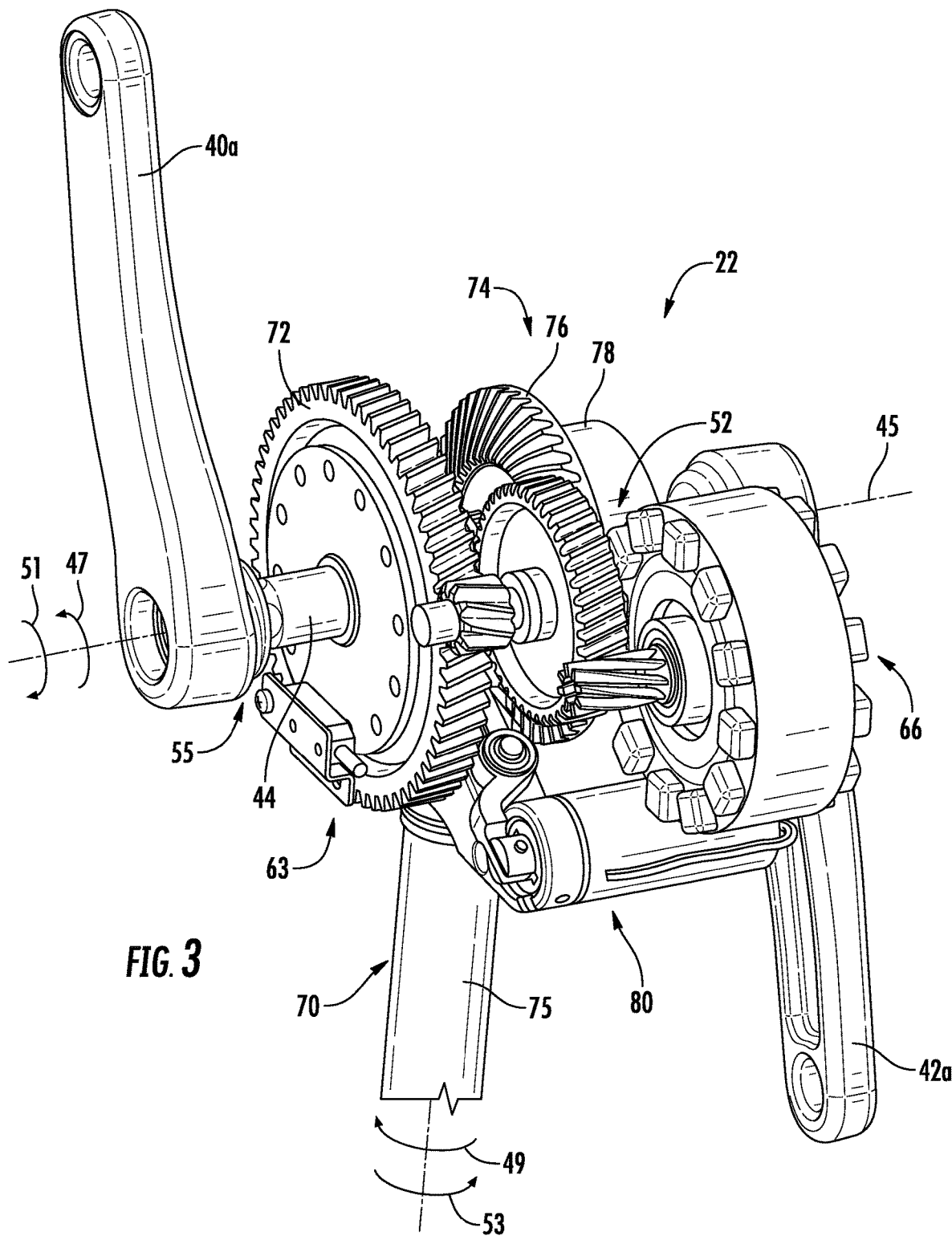
FIG. 3 is a partial illustration of the pedal drive system.

The sensors are represented by sensor arrangement 63 in FIG. 3. However, other sensors in other locations could be provided.

The foregoing sensors, however, are only several examples of many which could be used to monitor the operation of pedal drive system 22. All that is required is a sensor arrangement which is operable to detect one or more operational parameters of pedal drive system 22, for example pedaling speed and/or direction. Controller 62 utilizes such a sensor arrangement to look for a pedal state change (i.e. a change in pedaling speed or pedaling direction), to selectively transition assist and manual modes and vice versa.

User interface 64 may be directly associated with controller 62. As one example, where controller 62 is integrated into a multi-function display or mobile device, user interface 64 may be presented on such devices using the existing interface capabilities thereof. As another example, where controller 62 is a stand-alone unit housed within housing 50, or located elsewhere in watercraft 20, the same can include its own user interface 64 thereon. Alternatively, user interface 64 may be a separate component such as a wired or wireless remotely controlled device. As another alternative, user interface 64 may be presented directly on pedal drive system 22 as a separate interface and communicate with controller 62. User interface 64 may utilize any contemporary interface features, e.g. touch screen controls (see e.g. touch screen user interface 464 in FIG. 21), mechanical controls, motion controls, etc.

Figure 4:
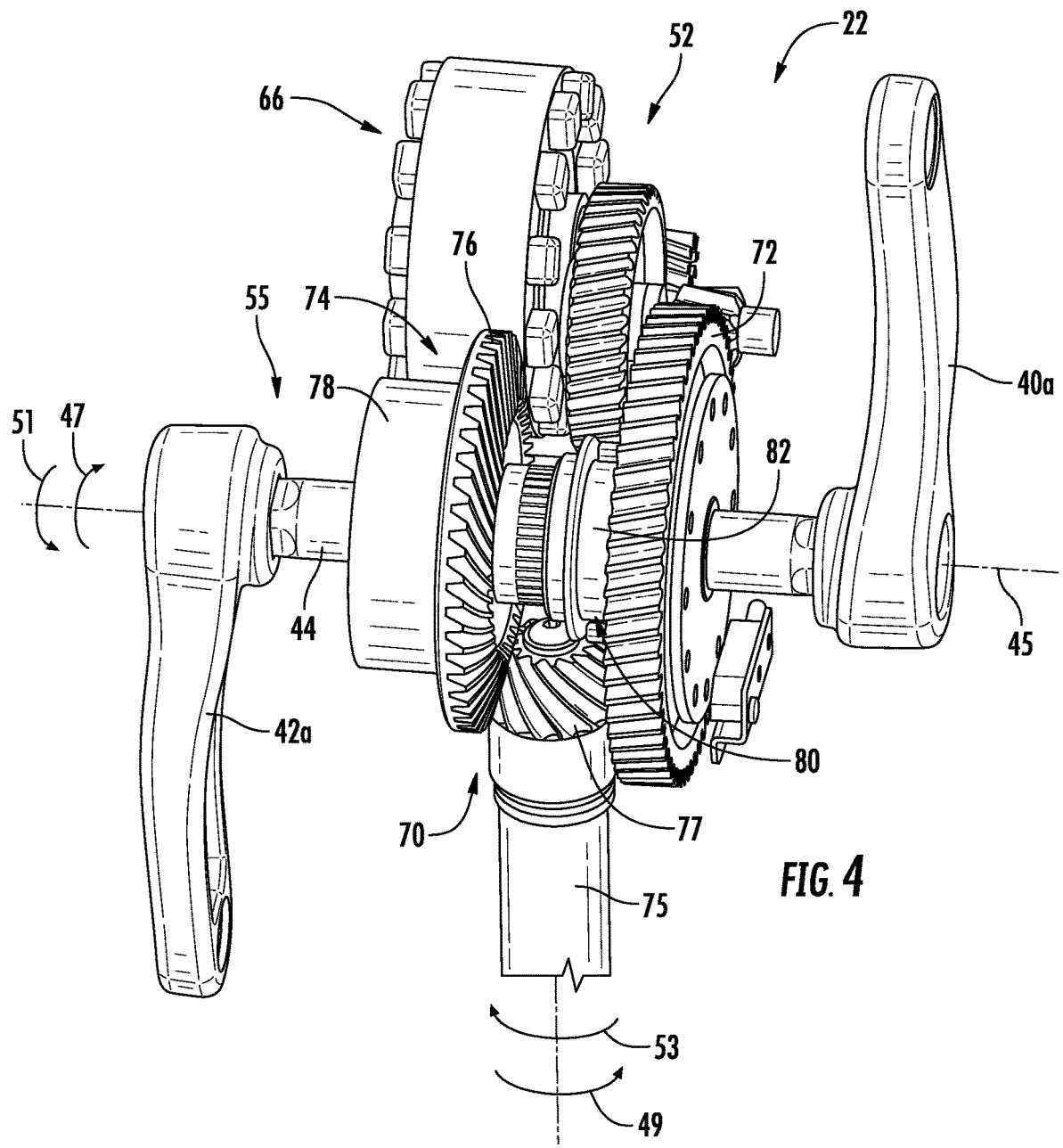
FIGS. 4 and 5 are partial illustrations of the pedal drive system illustrated in an assist mode.
Figure 5:
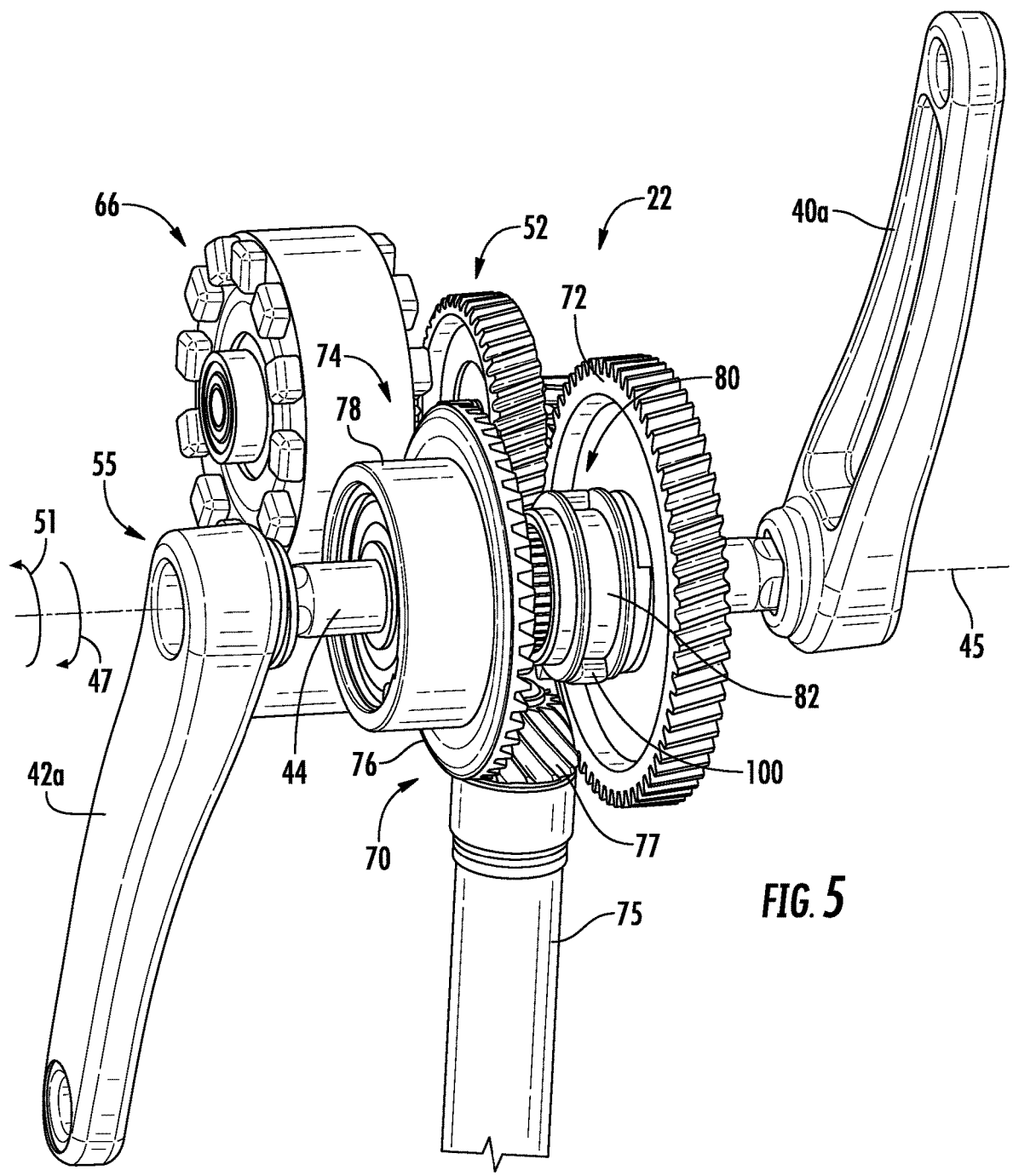

FIGS. 3-5 are simplified illustrations of the pedal drive system 22 with the outer housing removed to show portions of the assist drive train 52 and the manual drive train 55 and how they interact with the thrust unit 70.

The assist drive train 52 includes a plurality of gears interposed between electric motor 66 and bull gear 72. The gears between motor 66 and bull gear 72 are generally used to step down the output speed of motor 66. In other embodiments, the assist drive train 52 could include more or less gears between the motor 66 and bull gear 72. In some embodiments, the bull gear 72 may be directly driven by motor 66.

Figure 6:
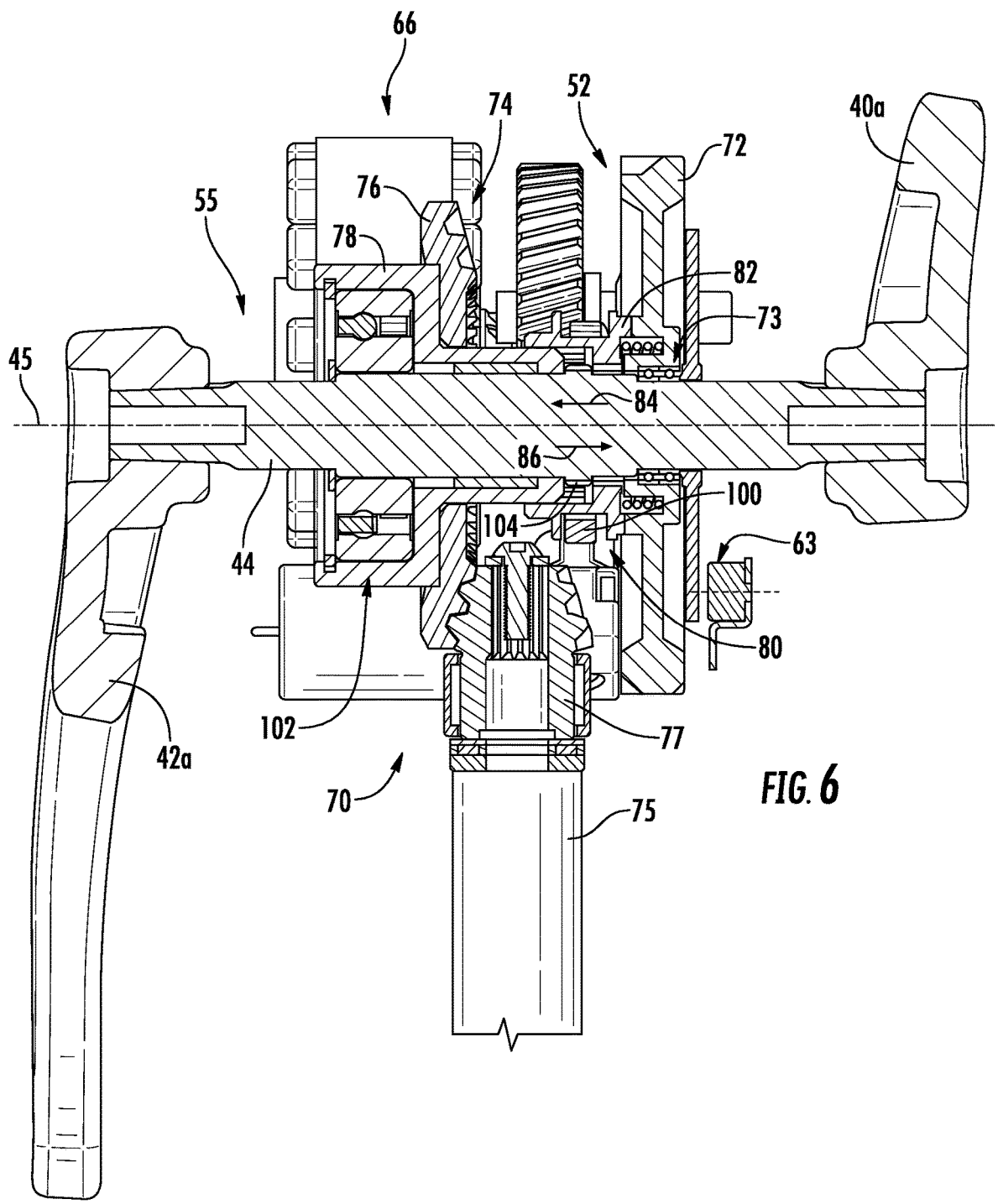
FIG. 6 is a cross-sectional illustration of the pedal drive system in the assist mode.

With reference to FIG. 6, the bull gear 72 is rotatably mounted for rotation about crankshaft axis 45. In this embodiment, a pair of bearings 73 are provided between the bull gear 72 and the crankshaft 44. The bull gear 72, in this embodiment, is thus rotatably mounted to the crankshaft 44.

In this embodiment, the manual drive train 55 is provided primarily by crankshaft 44, cranks 40a, 42a, and pedals 40, 42.

In FIGS. 3-5 the thrust unit 70 is represented by a bevel gear arrangement 74 and a drive shaft 75 that includes a cooperating gear 77. The bevel gear arrangement 74 includes a bevel gear 76 mounted to hub 78. Bevel gear 76 and hub 78 are fixed to one another such that rotation of either of the two components is transferred to the other component regardless of the rotational direction about axis 45.

In other embodiments, the bevel gear arrangement 74 is provided by a single component rather than a plurality of components fixed to one another.

Figure 7:
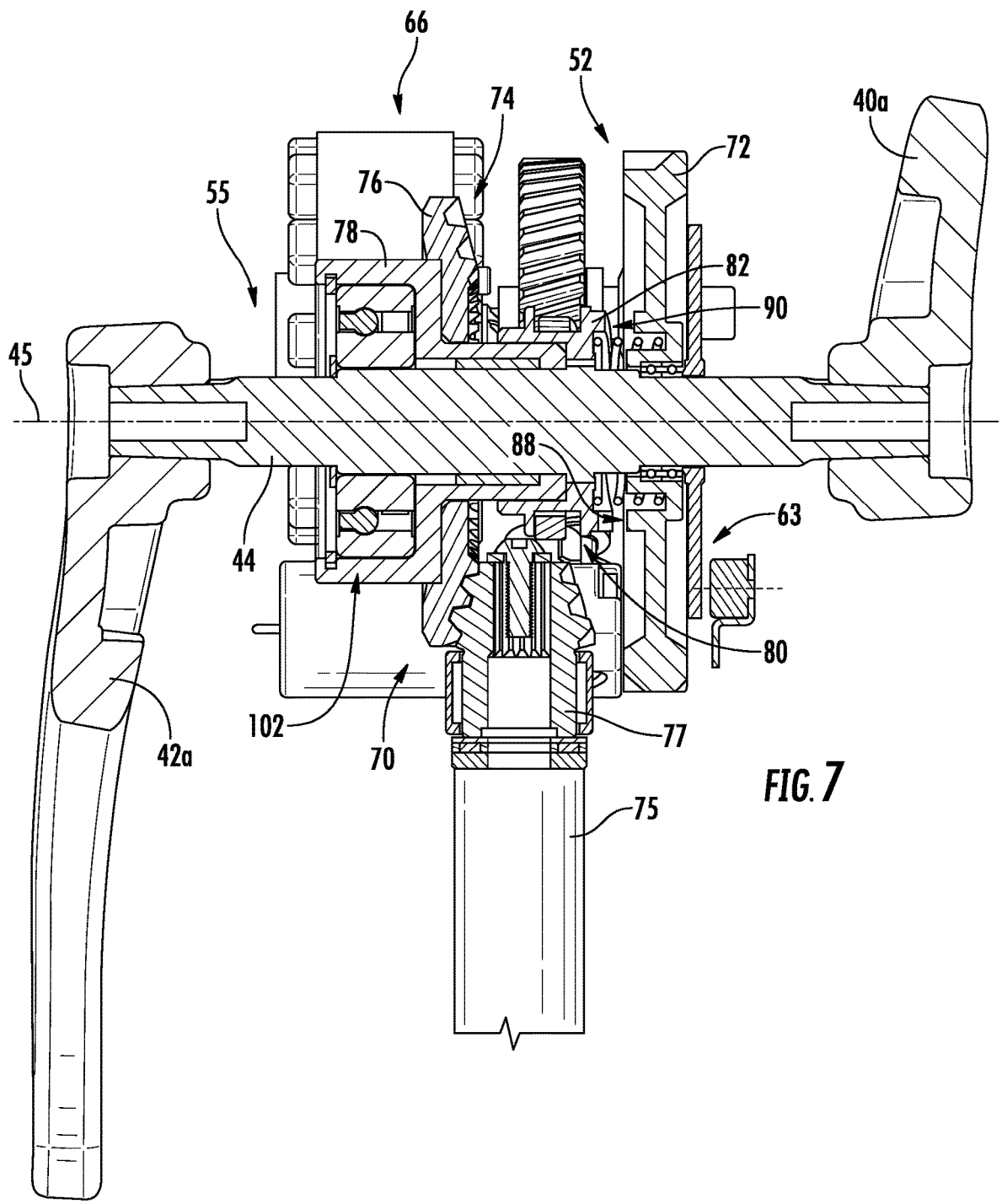
FIG. 7 is a cross-sectional illustration of the pedal drive system in a manual mode.

The pedal drive system 22 includes a coupling arrangement 80 that includes a coupler 82 that slides axially (illustrated by arrows 84 and 86 in FIG. 6) along crankshaft axis 45 to transition between the assist mode (FIGS. 3-6) and the manual mode (FIG. 7).

With reference to FIGS. 2, 3 and 7, in the manual mode, the coupler 80 mechanically couples the crankshaft 44 to the thrust unit 70. With this connection, rotation of the crankshaft 44 in the first angular direction 47 about the crankshaft axis 45 drives the thrust unit to output thrust in the first thrust direction 49 (illustrated as a straight arrow in FIG. 2 and angular motion of drive shaft 75 in FIG. 3).

Rotation of the crankshaft 44 in the second angular direction 51, opposite the first angular direction 47, about the crankshaft axis 44 drives the thrust unit 70 to output thrust in the second thrust direction 53 (illustrated as a straight arrow in FIG. 2 and angular motion of drive shaft 75 in FIG. 3), opposite the first thrust direction 49.

With reference to FIGS. 2, 3, 5 and 6, in the assist mode, coupling arrangement 80 mechanically couples the assist drive train 52 to the thrust unit 70. When the motor 66 is energized, the assist drive train 52 drives the thrust unit 70 to output thrust in the first thrust direction 49.

In a preferred embodiment, this coupling is performed by the coupler 82 rotationally coupling bull gear 72 to bevel gear arrangement 74.

In a preferred embodiment, in the assist mode, the coupling arrangement 80 operably couples the crankshaft 44 to the thrust unit 70 such that rotation of the crankshaft 44 by the user in the first angular direction 47 about the crankshaft axis 45 drives the thrust unit 70 to output thrust in the first thrust direction 49. However, rotation of the crankshaft 44 by the user in the second angular direction 51 about the crankshaft axis 45 does not drive the thrust unit 70 to output thrust in the second thrust direction 53. In other words, the crankshaft 44 and pedals can free wheel relative to the assist drive train 52 or otherwise be overrun by the assist drive train.

Figure 8:
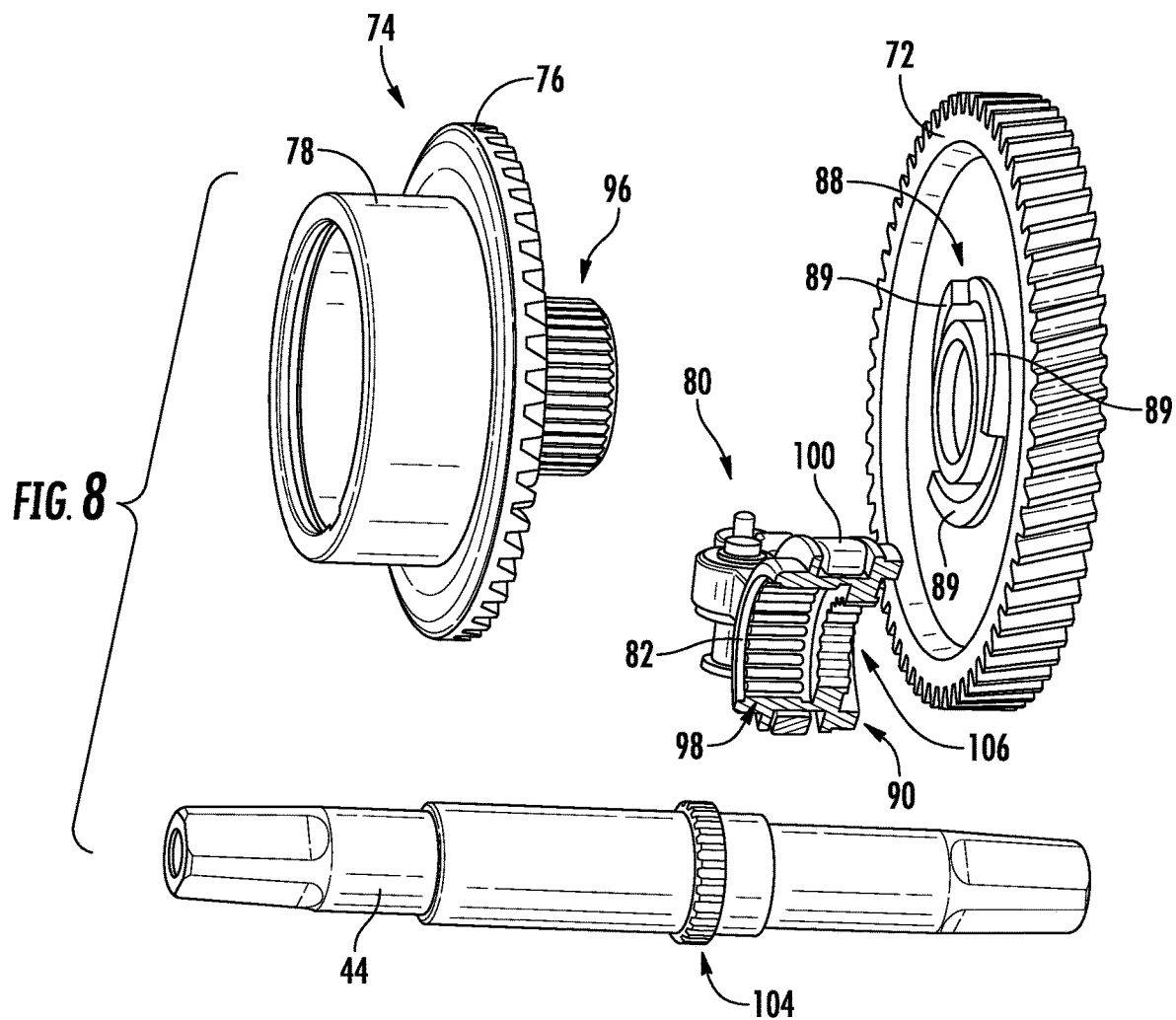
FIGS. 8 and 9 illustrate various torque transfer arrangements of the pedal drive system in an exploded representation.
Figure 9:
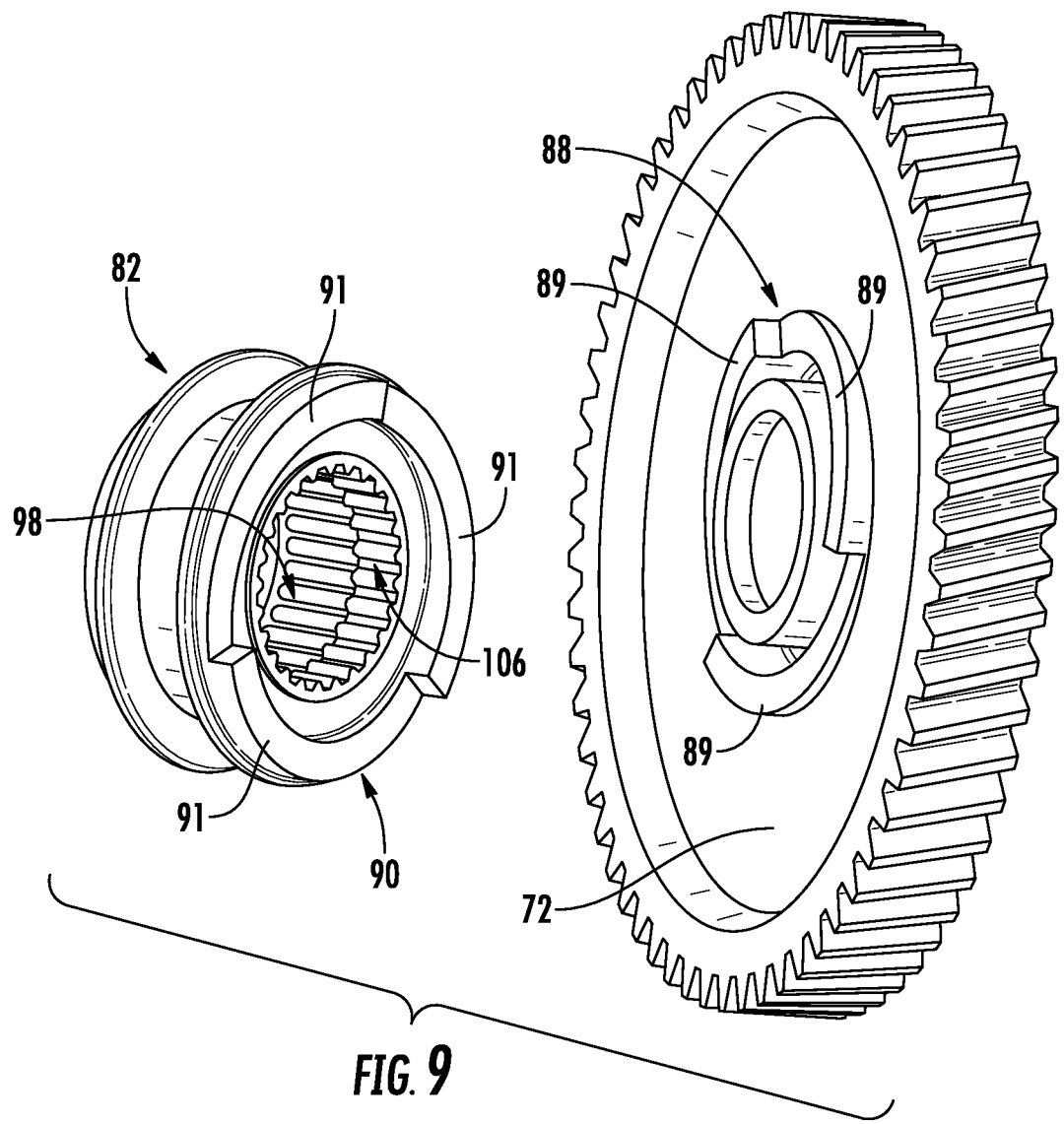

With particular reference to FIGS. 6, 8 and 9, the coupler 82 and the bull gear 72 have a torque transfer interface provided by a bull gear torque transfer arrangement 88 provided by a plurality of ramped surfaces 89 that extend angularly about crankshaft axis 45 that engages a first coupler torque transfer arrangement 90 provided by a corresponding plurality of ramped surfaces 91 that extend angularly about crankshaft axis 45.

The ramped surfaces 89, 91 angularly engage one another when the motor 66 operably drives bull gear 72 about axis 45. The coupler 82 may be biased axially along the crankshaft axis 45 to maintain the coupler 82 and bull gear 72 in axial and angular engagement such that torque generated by motor 66 is transferred therebetween.

The orientation of the ramped surfaces allows for the ramped surfaces 89, 91 to angularly slide relative to one another when a differential in rotational speed exists between the coupler and bull gear faces. The two mating elements can engage axially over some degree of relative angular rotation. Non-ramped elements must align prior to the start of axial movement or axial movement is precluded. The ramped surfaces softly engage whereas square dogs will rapidly engage once proper angular alignment occurs, which can be noisy and/or result in undesirable wear or damage to the components. However, ramped surfaces can only drive in one angular direction.

This biasing could be provided by a resilient biasing member such as a spring or a lever such as a pivot lever 100 used to transition the coupler 82 between the assist and manual modes.

In addition to being rotationally coupled to bull gear 72, the coupler 82 is rotationally engaged with bevel gear arrangement 74 at a further torque transfer interface provided by a bevel gear torque transfer arrangement in the form of splined arrangement 96 that engages a second coupler torque transfer arrangement in the form of splined arrangement 98.

Thus, the engagement of the coupler 82 with the torque transfer arrangement 88 of the bull gear 72 and the splined arrangement 96 of the bevel gear arrangement 74, torque produced by the bull gear 72 via motor 66 is transferred to bevel gear arrangement 76 and ultimately to drive shaft 75 to drive propeller 48.

This torque transfer interface is configured such that the coupler 82 can slide axially along the crankshaft axis 45 relative to the bevel gear arrangement 74 while the splined arrangements 96, 98 remain angularly engaged with one another.

More particularly, the coupler 82 can slide between the position illustrated in FIG. 6 corresponding to the assist mode and the position illustrated in FIG. 7 corresponding to the manual mode to transition the operating mode of the pedal drive system 22.

When in the assist mode, the user can still use the pedals to power the watercraft in the forward direction, e.g. generate thrust in the first thrust direction 49 (FIG. 1). However, if the user attempts to pedal in the reverse direction, this motion is not transferred to the thrust unit 70 or the assist drive train 52.

This capability is provided by a one-way clutch 102 interposed between the bevel gear arrangement 74 and the crankshaft 44. More particularly one-way clutch 102 is configured to transfer torque from the crankshaft 44 to the bevel gear arrangement 74 only in the first angular direction 47 about crankshaft axis 45. However, if the user tries to pedal backwards and transfer torque in the second angular direction 51, the one-way clutch 102 will not transfer the torque from the crankshaft 44 to the bevel gear arrangement 74.

Keys or other devices can angularly connect the one-way clutch 102 to the crankshaft 44 and the bevel bear arrangement 74.

In the manual mode, the crankshaft 44 is angularly coupled to the bevel gear arrangement 74 by coupler 82 of the coupling arrangement 80. However, the coupler 82 is disconnected from bull gear 72. As such, any output from motor 66 is not transferred to the crankshaft 44 or the thrust unit 70.

More particularly, the splined arrangements 96, 98 remain engaged to angularly couple the coupler 82 to the bevel gear arrangement 74.

A further torque transfer interface is provided by a crankshaft torque transfer arrangement in the form of crankshaft splined arrangement 104 (see FIG. 8) and a second splined arrangement 106 provided by the coupler 82.

Notably, coupler 82 is generally in the form of a collar that extends around crankshaft 44. In this embodiment, both splined arrangements 98 and 106 of the coupler 82 are formed on an inner periphery of the collar forming coupler 82.

The inner diameter of the splined arrangements 98, 106 is different. In particular, the inner diameter of splined arrangement 98 is greater than the inner diameter of splined arrangement 106. With this arrangement, the splined arrangement 98 does not engage the crankshaft splined arrangement 104 when in the assist mode (see e.g. FIG. 6).

The torque transfer interface provided by splined arrangements 104 and 106 angularly couples the crankshaft to the bevel gear arrangement 74 for angular rotation in both the first and second angular directions about crankshaft axis 45. This allows the user to pedal in both a forward direction and a backward direction while transferring torque to the thrust unit 70 in both directions. Thus, the user can propel the watercraft both forward and backward when in the manual mode by way of the manual drive train 55, e.g. pedals 40, 42.

Figure 10:
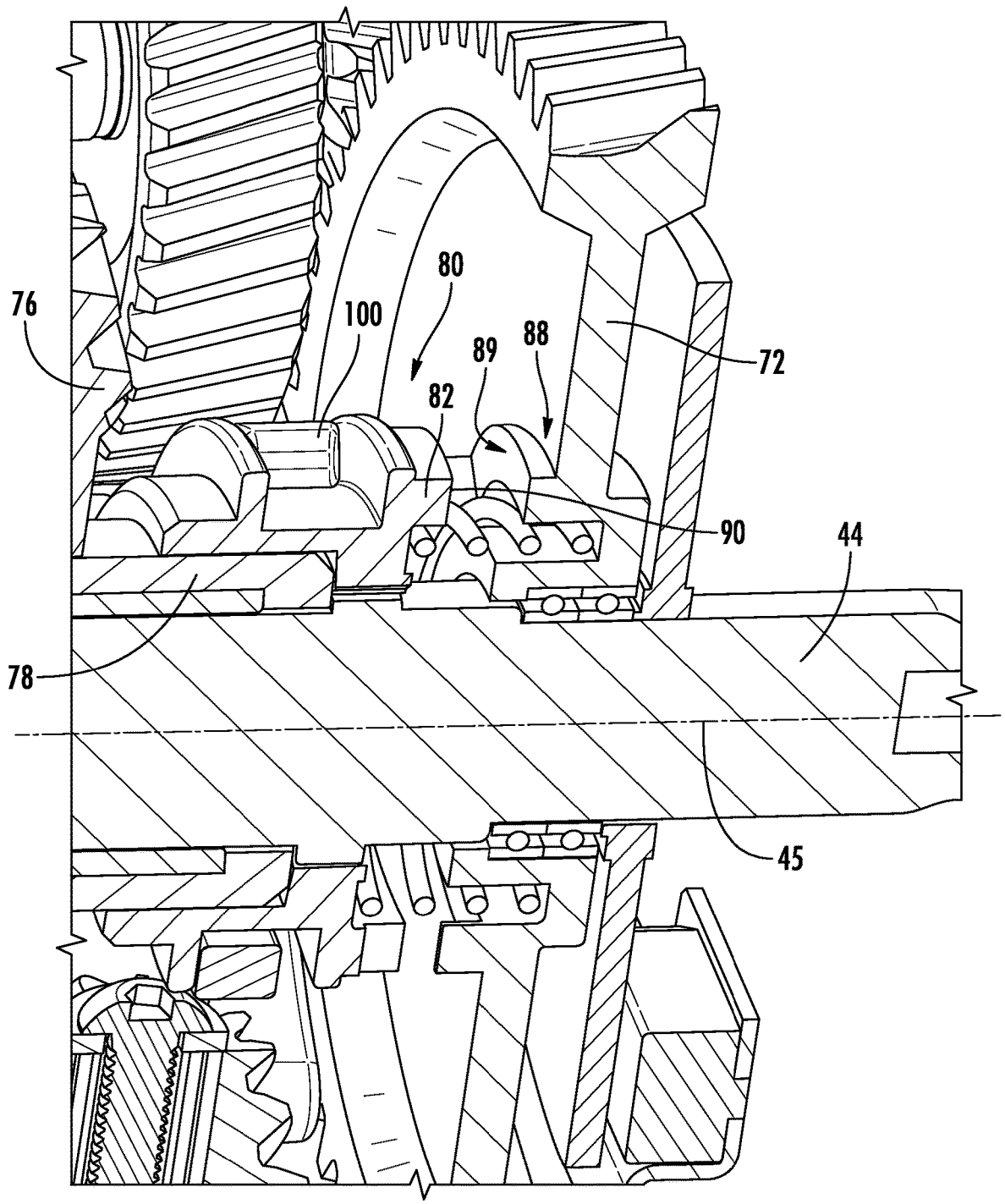
FIGS. 10 and 11 are an enlarged illustrations of the pedal drive system in the manual mode.
Figure 11:
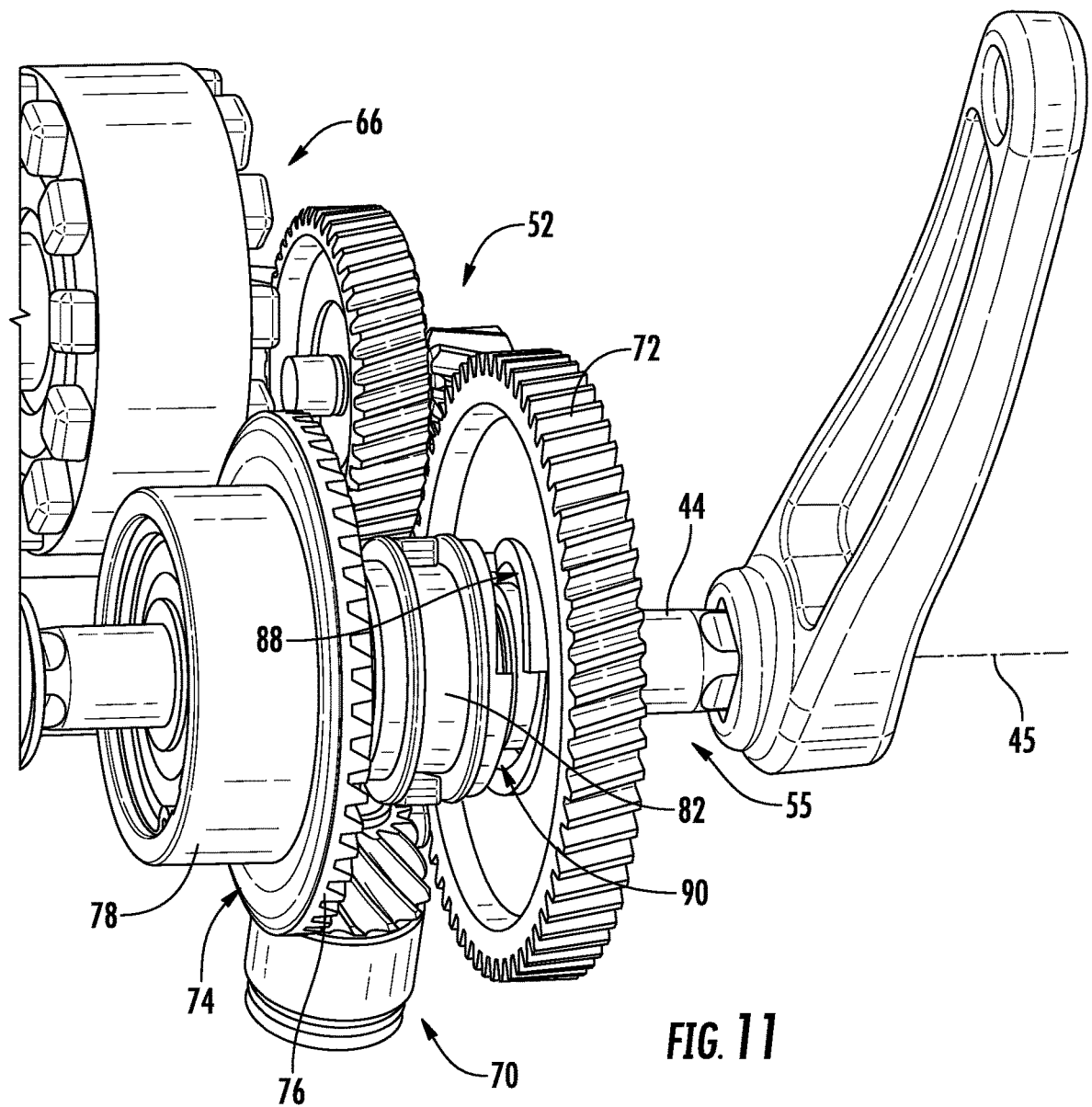

FIGS. 10 and 11 illustrate the pedal drive system 22 in the manual mode with the coupler 82 disengaged from the bull gear 72.

Figure 12:
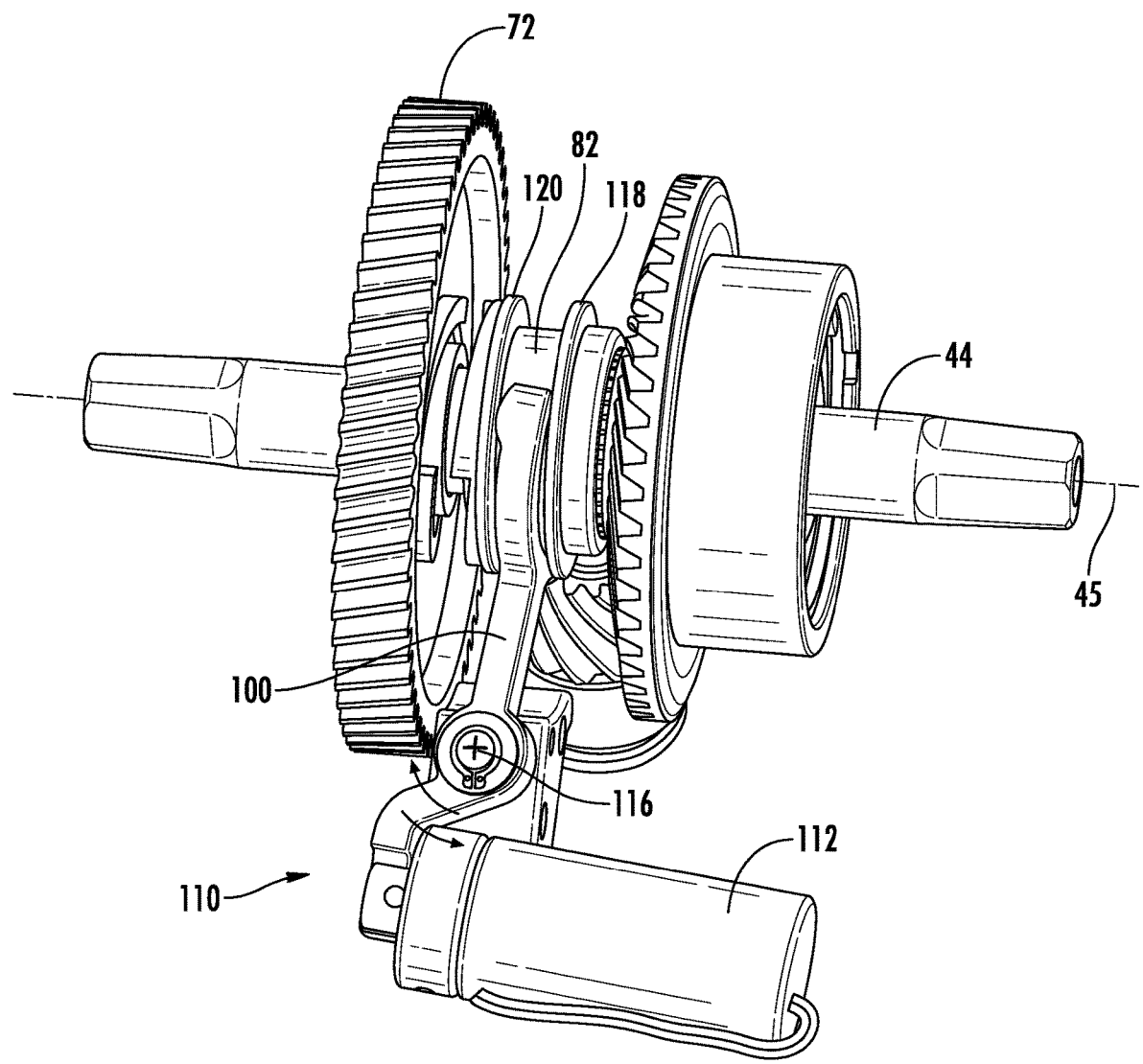
FIG. 12 is an illustration of the pedal drive system illustrating the coupler actuating arrangement in the manual mode.
Figure 13:
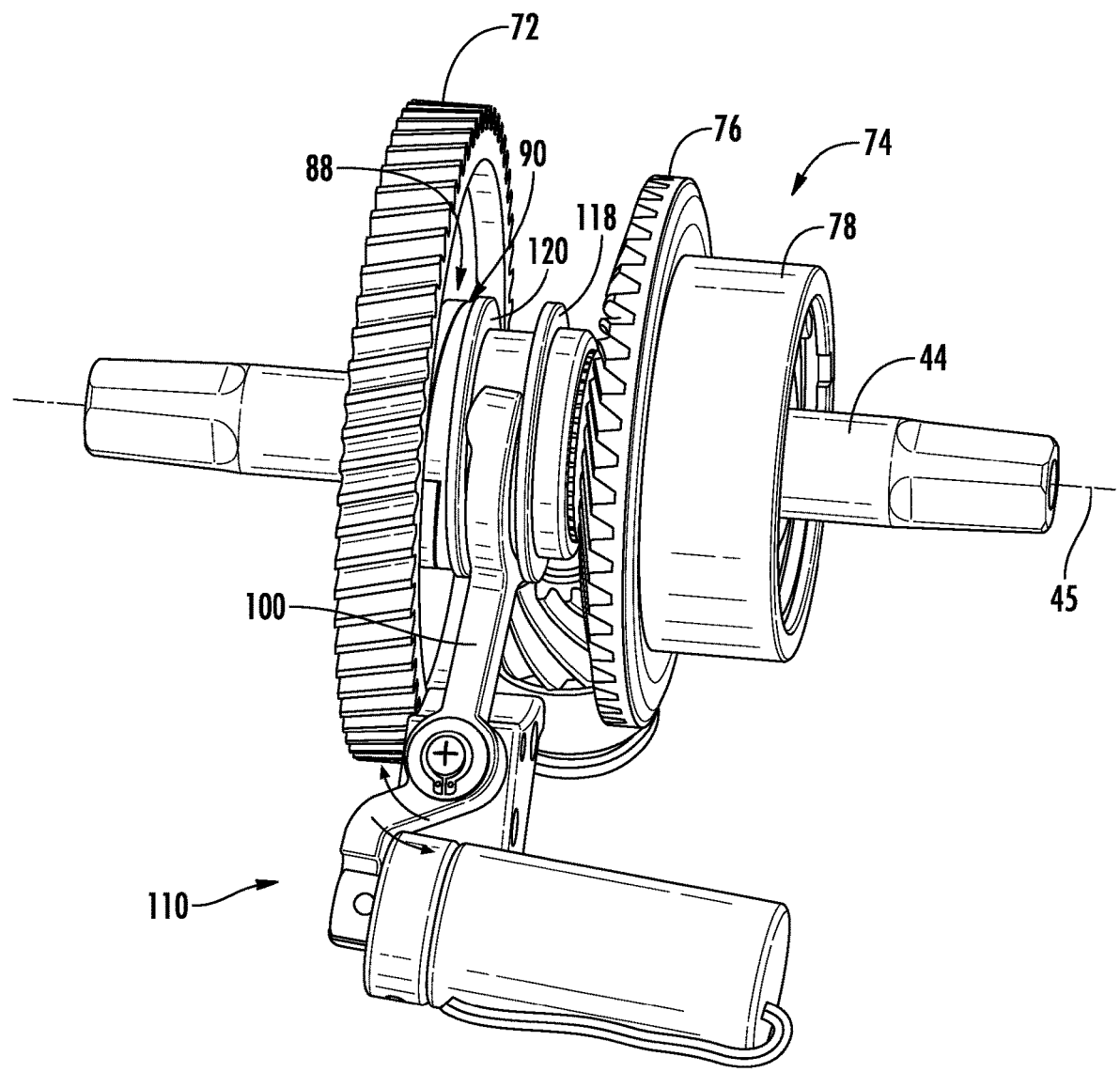
FIG. 13 is an illustration of the pedal drive system illustrating the coupler actuating arrangement in the assist mode.

FIGS. 12 and 13 illustrate a coupling actuator 110 that drives the coupler 82 to transition between the assist mode and manual mode. FIG. 12 illustrates the coupler 82 in the manual mode while FIG. 13 illustrates the coupler 82 in the assist mode.

To transition the coupler 82 between the two positions, the coupling actuator 110 of this embodiment includes an electromechanical coupling actuator in the form of a solenoid 112 that drives a pivot lever 100 about axis 116.

More particularly, pivot lever 100 includes one end coupled to solenoid 112 and the opposed forked end engaging coupler 82. The forked end is received in an annular groove formed in the outer periphery of the coupler 82. Thus, the forked end can apply axial force to either sidewall 118 or 120 to axially translate the coupler 82 along crankshaft axis 45 to engage or disengage torque transfer arrangements 88, 90 as necessary.

It is noted that the solenoid 112 can be coupled to the controller 62 and power supply 60 described above. When the user switches between modes, the controller 62 can properly energize or energize the solenoid 112. Typically, as the default mode would be the manual mode, the solenoid would be energized when transitioning to the assist mode. This would typically also energize motor 66 of the assist drive train 52.

Other electromechanical coupling actuators could be employed. For example, a straight linear actuator that drives the coupler 82 could be provided. Further, electromagnetic actuation could be provided.

With reference to FIGS. 14-20, portions of a further pedal drive system 222 that can be transitioned between an assist mode and a manual mode is illustrated. More particularly, an assist drive train 252, a manual drive train 255, a thrust unit 270 and a coupling arrangement 280 of the pedal drive system 222 are illustrated. However other components are typically provided such as pedals, drive shafts, a propeller, controller, power supply, user interface, a protective housing, to name a few. The pedal drive system 222 can be transitioned between the assist mode and the manual mode.

A pedal drive system 222 can be swapped with the pedal drive system 22 in FIGS. 1 and 2. Updated images including this arrangement are thus not included as they are unnecessary for an understanding of the invention. Reference to the thrust directions in FIGS. 1 and 2 will be used to explain this embodiment.

The assist drive train 252 includes a motor 266 and a plurality of gears interposed between the motor and the thrust unit 270. The number of gears between the motor and the thrust unit 270 can be more or fewer than illustrated.

The manual drive train 255 in this embodiment is primarily the pedals and cranks (not shown) and the crankshaft 244 that rotates about crankshaft axis 245.

The thrust unit 270 is represented by the several gears, but it will be understood that other components such as a drive shaft, propeller and additional gears may be optionally provided by the thrust unit.

FIGS. 14-16 and 20 illustrate the pedal drive system 222 in the manual mode. In this mode, the user can drive the thrust unit to generate thrust in both the first and second thrust directions 49, 51 by pedaling the crankshaft 244 about the crankshaft axis 245 in the opposite first and second angular directions.

To transfer rotational motion of the crankshaft 244 to the thrust unit, a coupling arrangement 280 connects the crankshaft 244 to gear 274, which is a combined bull gear and bevel gear forming part of the thrust unit 270. Gear 274 includes a bull gear region 276 and a bevel gear region 278 that are coupled to rotate together in both angular directions about crankshaft axis 245. For manual mode, only the bevel gear region 276 is required.

Gear 274 rotates about crankshaft axis 245 when thrust is generated by the thrust unit 270.

The two regions could be formed from a single component or could be separate components coupled together, such as by pins, adhesive, screws, bolts or other fastening mechanisms.

A first torque transfer interface is provided between the coupler 282 and the bevel gear region 276. The first torque transfer interface is provided by a first torque transfer arrangement in the form of axial end face 288 of gear 274 and a cooperating second torque transfer arrangement in the form of axial end face 290 of the coupler 282. The axial end face 290 of the coupler includes keys (also referred to as dogs) in the form of axially extending projections 291 that are axially received in corresponding key slots 289 (also referred to as dog slots) formed in the axial end face 288 of the gear 274. Projections and slots 291/289 may also take the form of angular engaging dogs as described below. Thus, the keys could be in the form of inter-engaging dogs.

In addition to extending axially, the projections 291 extend radially relative to the crankshaft axis 245 such that engagement with slots 289 transfers torque therebetween when engaged.

It is noted that the axial end face 288 of the gear 274 is provided by a interface plate that is a separate component from bull and bevel gear regions 274, 276 that is attached thereto for rotation therewith. Again, the interface plate could be formed with the gear regions 274, 276 as a single piece in other embodiments. However, by making these three components separate pieces, manufacture of gear 274 is cheaper and easier. Again, screws, pins, adhesive, etc. could be used to secure the interface plate to the other components.

A second torque transfer interface is provided between the coupler 282 and crankshaft 244. In the illustrated embodiment, this torque transfer interface is provided by a key 296 that rotationally couples the coupler 282 to the crankshaft 244 for rotation in both angular directions about crankshaft axis 245.

Figure 18:
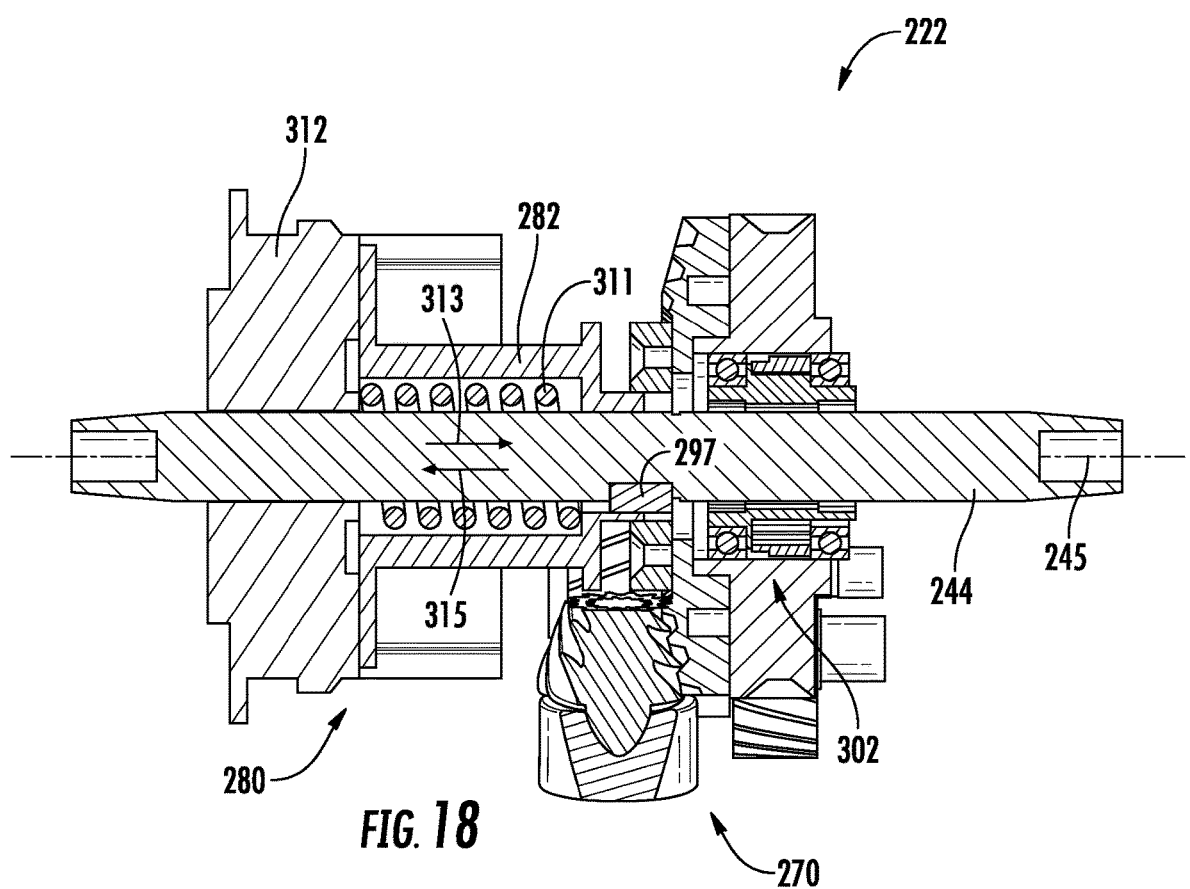
FIG. 18 is a cross-sectional illustration of the pedal drive system in the assist mode.
Figure 19:
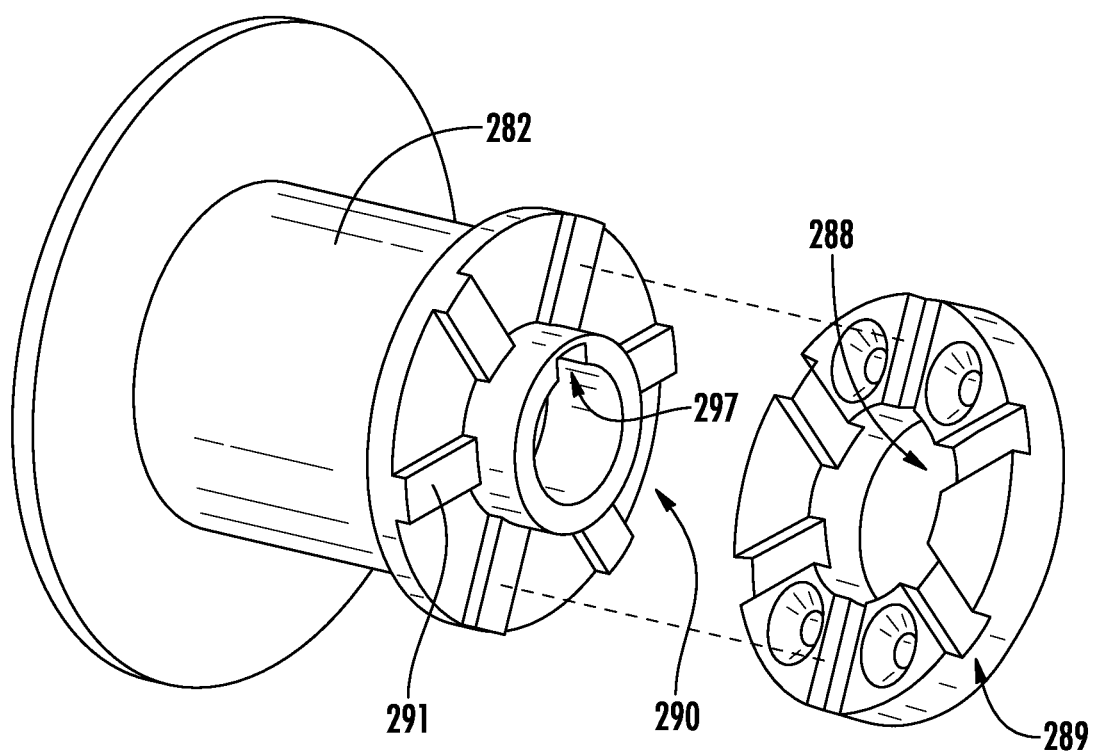
FIG. 19 illustrates torque transfer arrangements of the pedal drive system.
Figure 20:
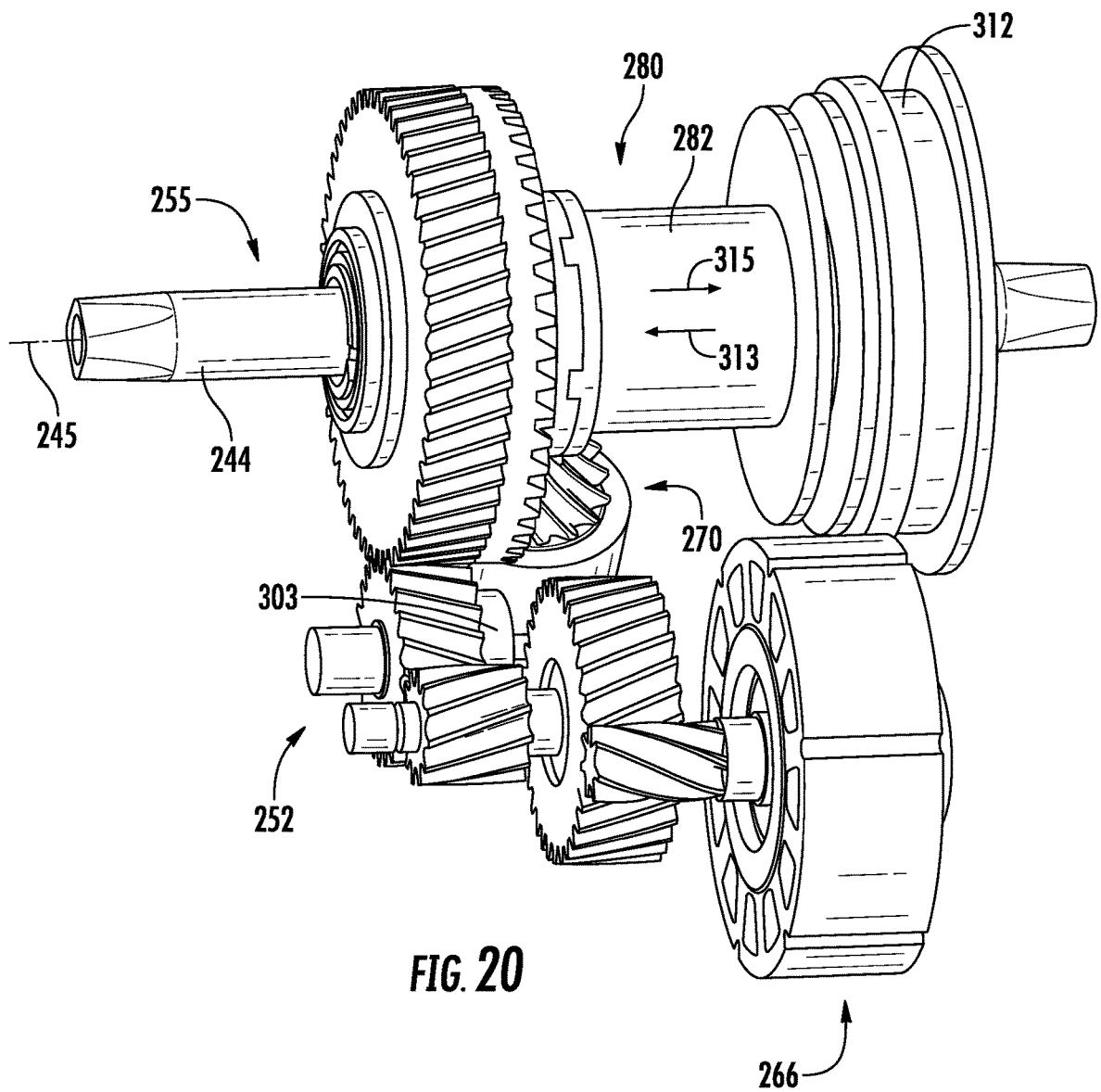
FIG. 20 illustrates the pedal drive system in the manual mode.

Key 297 engages a slot formed in an inner peripheral surface of coupler 282 (see FIG. 19 for the slot where key 297 would be inserted). The second torque transfer interface is configured to permit the coupler 282 to slide axially along the crankshaft 244 parallel to crankshaft axis 245, e.g. illustrated by arrows in opposite directions in FIGS. 14-18 and 20.

In other embodiments, the torque transfer interface could be similar to the cooperating spline arrangements described above.

As such, when the first and second torque transfer arrangements (e.g. end faces 288 and 290) are engaged and the user inputs force into the pedals in either angular direction about crankshaft axis 245, this force and motion is transferred through the coupler 282 to gear 274 of the thrust unit 270.

A one-way clutch 303 is provided to disconnect the assist drive train 255 from the rest of the assembly and prevent the assist drive train 255 from providing unnecessary resistance while the user is pedaling, such as by way of requiring the user to back drive the gears and motor 266 of the assist drive train 255.

A biasing member illustrated in the form of coil spring 311 biases the coupler 282 toward gear 274. As such, the manual mode is the default mode.

Figure 14:
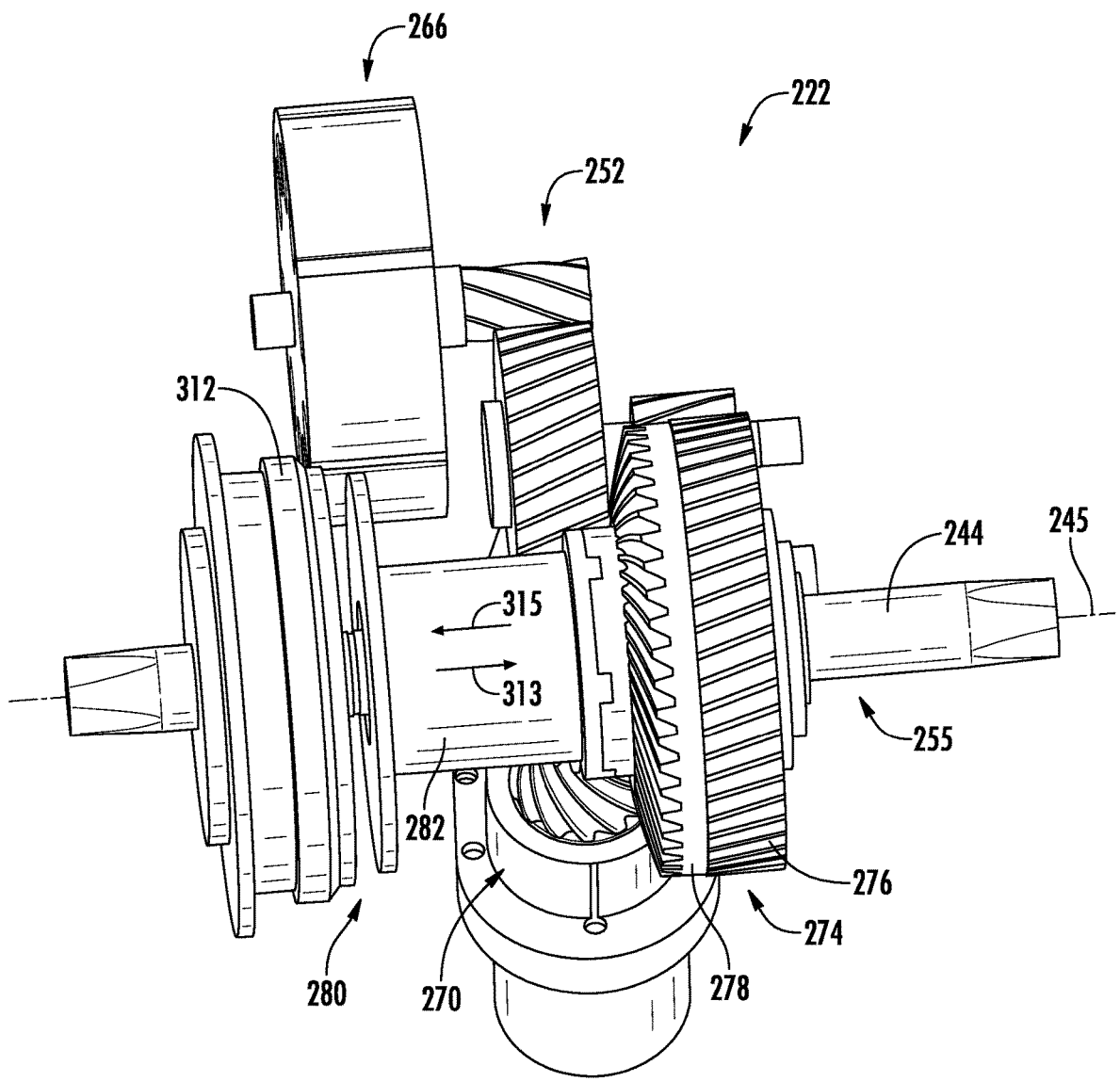
FIGS. 14 and 15 illustrate a further pedal drive system in a manual mode.
Figure 15:
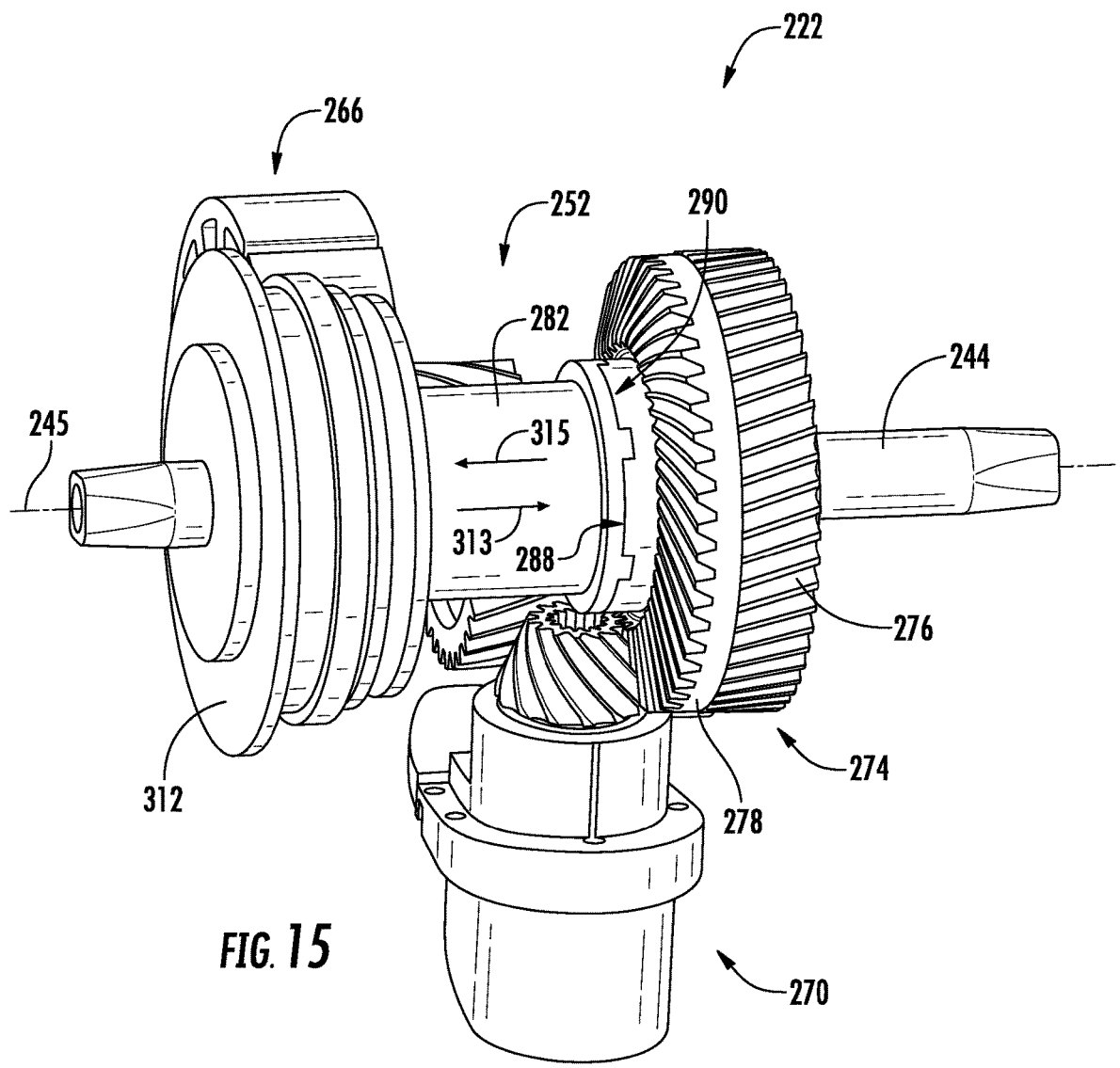
Figure 16:
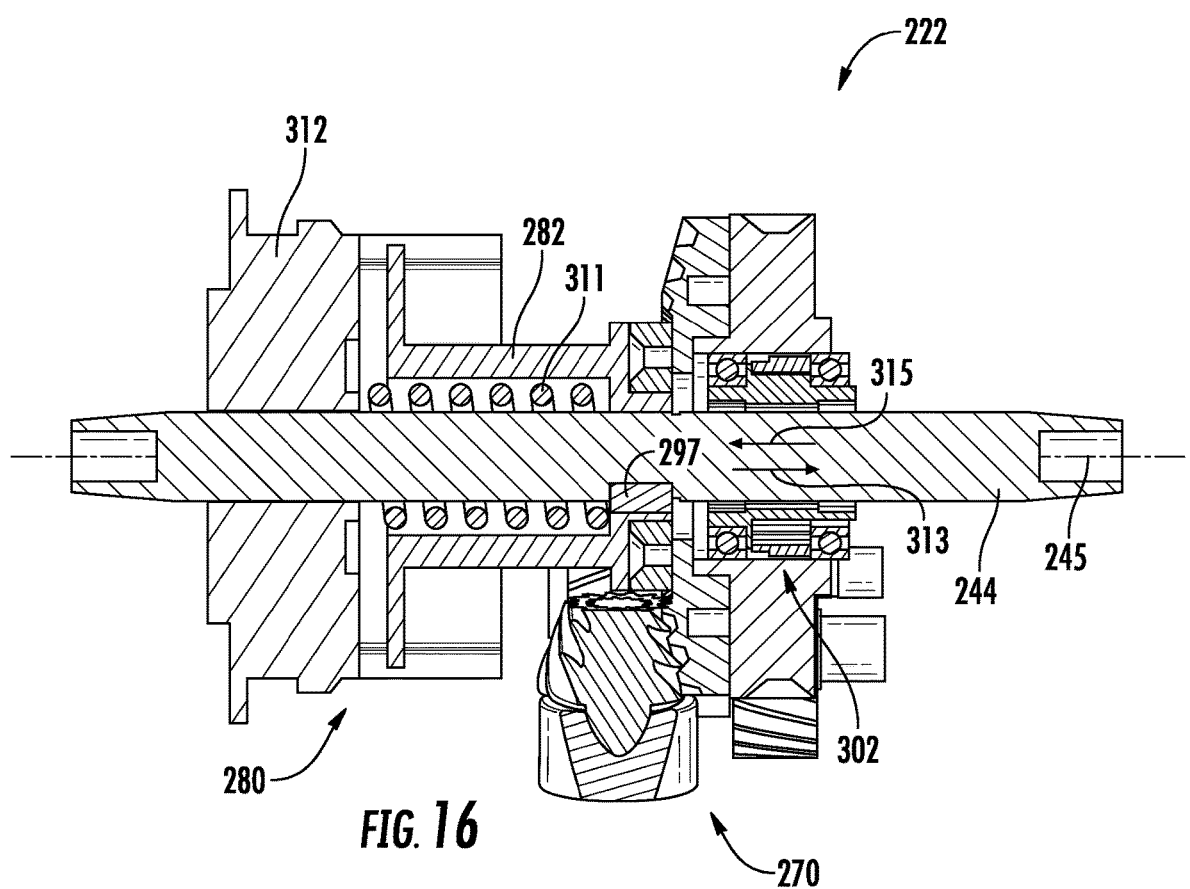
FIG. 16 is a cross-sectional illustration of the pedal drive system in the manual mode.
Figure 17:
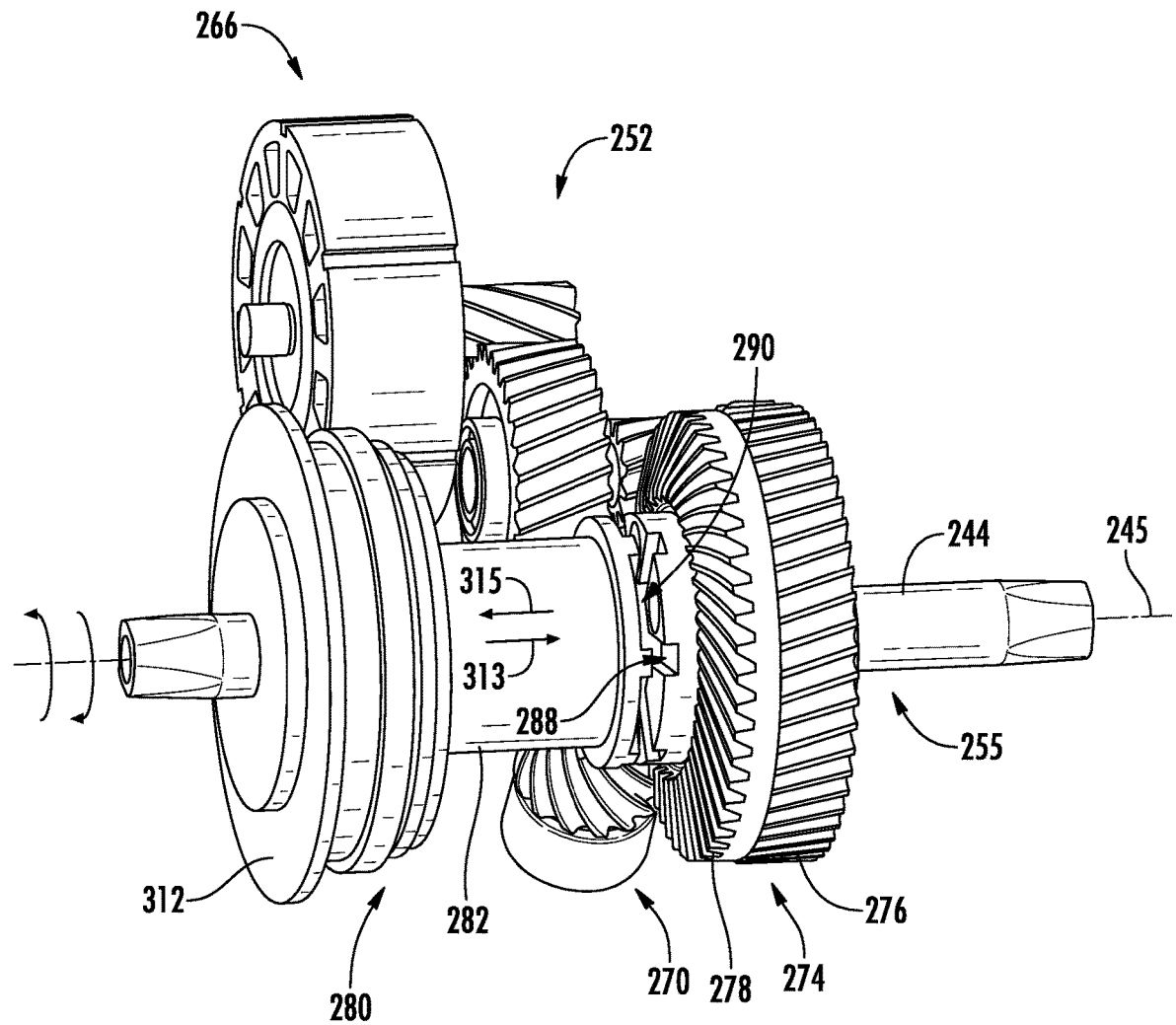
FIG. 17 illustrates the pedal drive system in the assist mode.

The coupling arrangement 280 includes a coupling actuator 312 to move the coupler 282 from the position illustrated in FIGS. 14-16 to the position illustrated in FIGS. 17 and 18 to transition the pedal drive system 222 from the manual mode to the assist mode.

In this embodiment, the coupling actuator 312 is in the form of an electromagnet that when energized disengages the coupler 282 from gear 274 by sliding the coupler 282 along crankshaft axis 245, illustrated by arrow 315. Notably, when the electromagnet is deenergized, the coupler 282 is driven back into engagement with gear 274 by coil spring 311, illustrated by arrow 313.

Other coupling actuators 312 are contemplated. For example, a linear actuator or coupling actuator 110 could be employed to properly transition coupler 282 between its engaged (manual mode) and disengaged (assist mode) positions.

With the coupler 282 in the position illustrated in FIGS. 17-18, rotation of crankshaft 244 about axis 245 is not transferred to the gear 274 via coupler 282. Instead, for the user to use the pedals to generate thrust with the thrust unit 270, a one-way clutch 302 is provided between gear 274 and crankshaft 244.

The one-way clutch 302 only transfers rotational motion of the crankshaft 244 in the first angular direction about axis 245 to gear 274. As such, in the assist mode, the user can only use the pedals to generate thrust in the first thrust direction 49 to propel the watercraft in a forward direction. The one-way clutch 302 will also allow the motor 266 to overrun the crankshaft 244 in the event that the user is pedaling slower than the speed at which the motor 266 is driving gear 274.

In the assist mode, the coupler 282 will rotate with the crankshaft 244 if the user rotates the crankshaft, however, no torque is transferred to the thrust unit 270 and gear 274 through the coupler 282, only through the one-way clutch 302.

Thus, it should be readily apparent that the coupler 282 can be selectively engaged with gear 274 to enter the manual mode and selectively disengaged from gear 274 to enter the assist mode.

The coupling actuator 312 and motor 266 can be operably coupled to controller 62 and power supply 60 such that they are operably simultaneously or sequentially energized when the user activates the assist mode. It is noted that the torque and speed sensors discussed above can be used to automatically disable assist mode if the user significantly reduces the rotational speed at which the user is pedaling such as by way of stopping pedaling or backpedaling.

Figure 21:
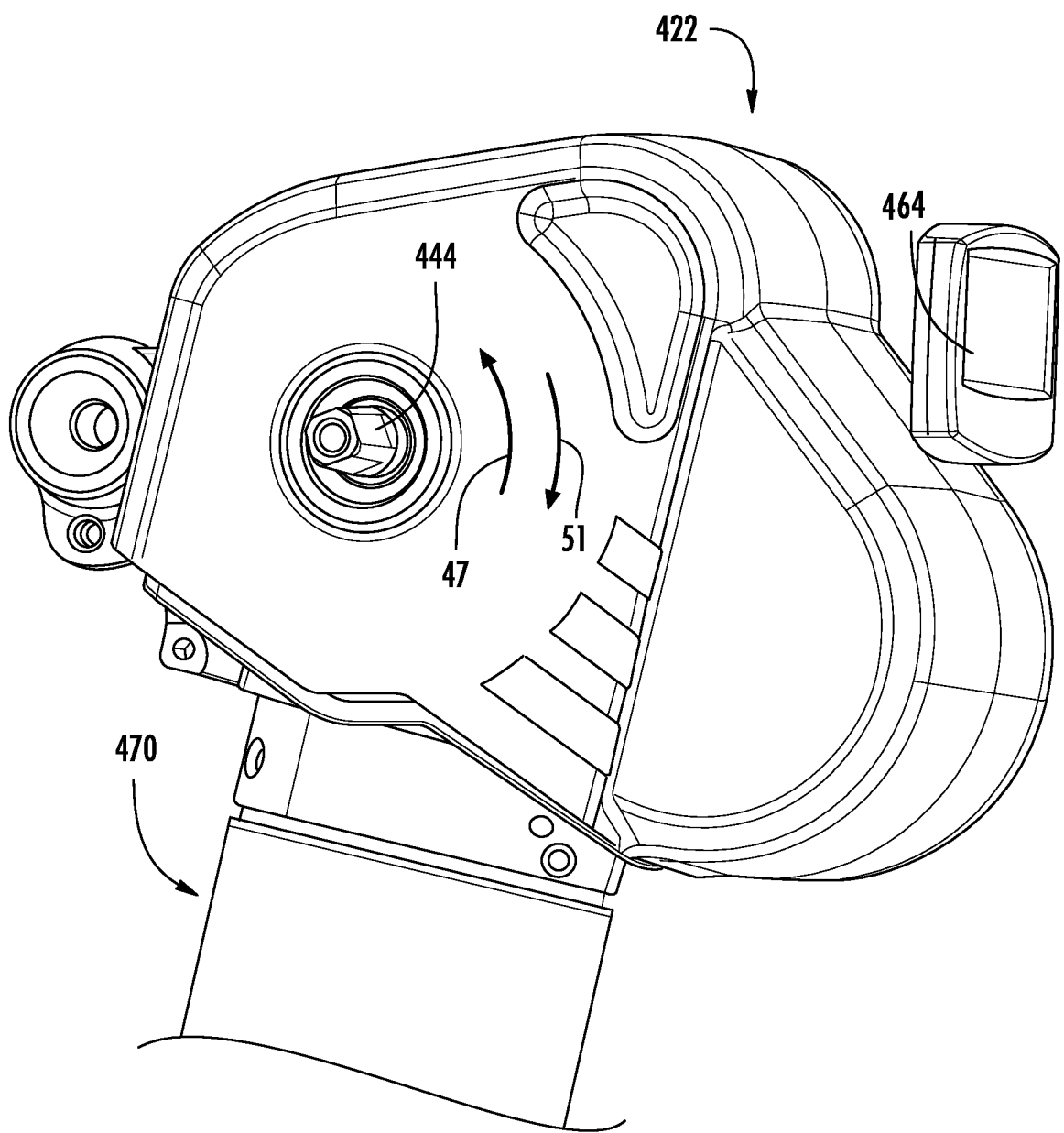
FIG. 21 is a perspective illustration of a further embodiment of a portion of a pedal drive system according to the application.

FIG. 21 is a simplified partial illustration of a further pedal drive system 422. The drive shaft, propeller and pedals have been removed for simplicity but would be included such as illustrated in prior designs. This pedal drive system 422 can again be selectively transitioned between an assist mode and a manual mode.

With reference to FIGS. 22-25, portions of the pedal drive system 422 are illustrated. The pedal drive system includes an assist drive train 452, a manual drive train 455, a thrust unit (not shown) and a coupling arrangement 480.

The assist drive train 452 includes a motor 466 and a plurality of gears interposed between the motor 466 and the thrust unit. The number of gears between the motor 466 and the thrust unit can be more or fewer than illustrated.

The manual drive train 455 in this embodiment is primarily the pedals and cranks (not shown) and the crankshaft 444 that rotates about crankshaft axis 445.

The thrust unit 470 is represented by a bevel gear, but it will be understood that other components such as a drive shaft, propeller and additional gears may be optionally provided by the thrust unit.

Figure 22:
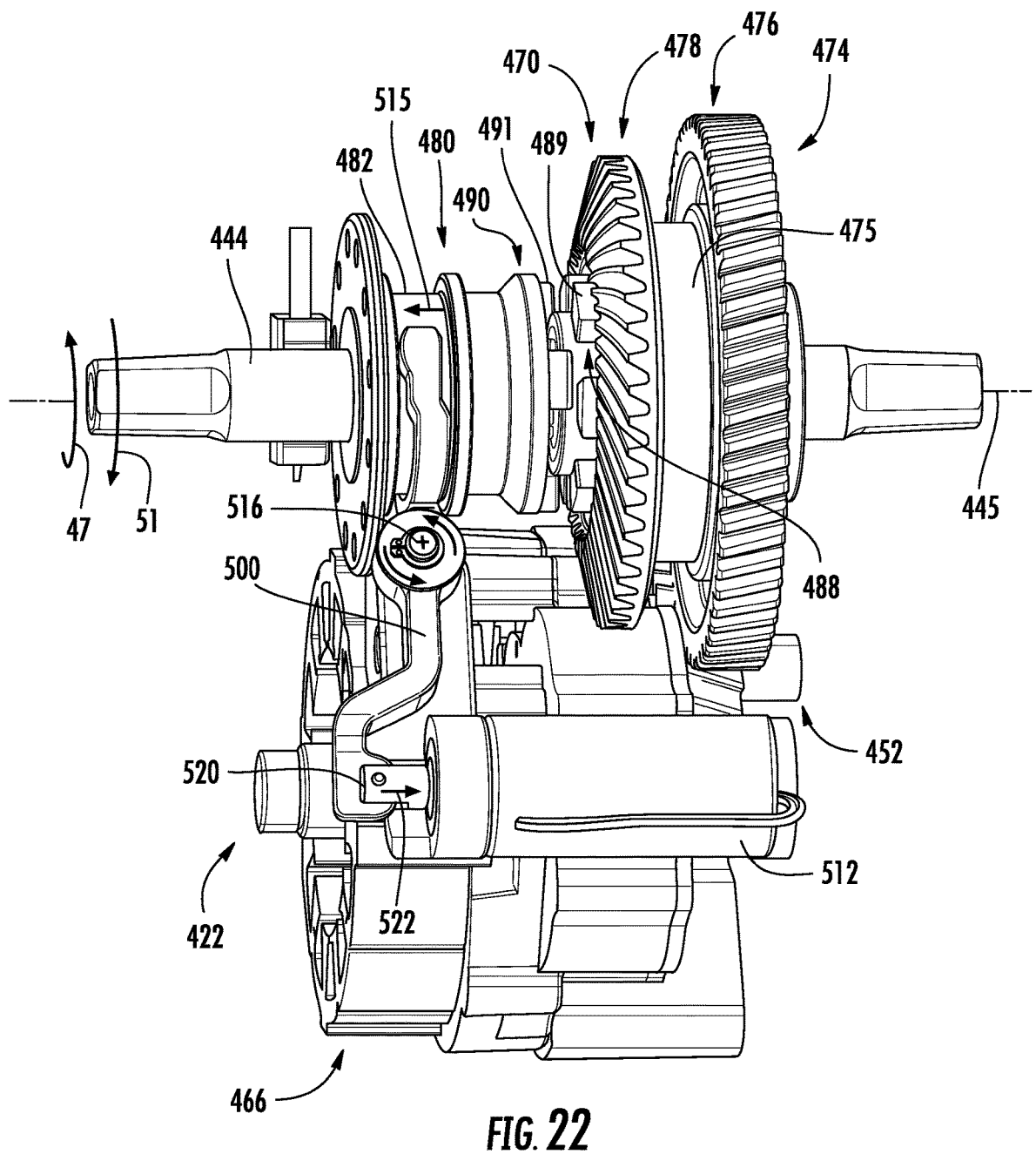
FIG. 22 is a partial perspective illustration of the pedal drive system of FIG. 21 with the outer housing removed.
Figure 23:
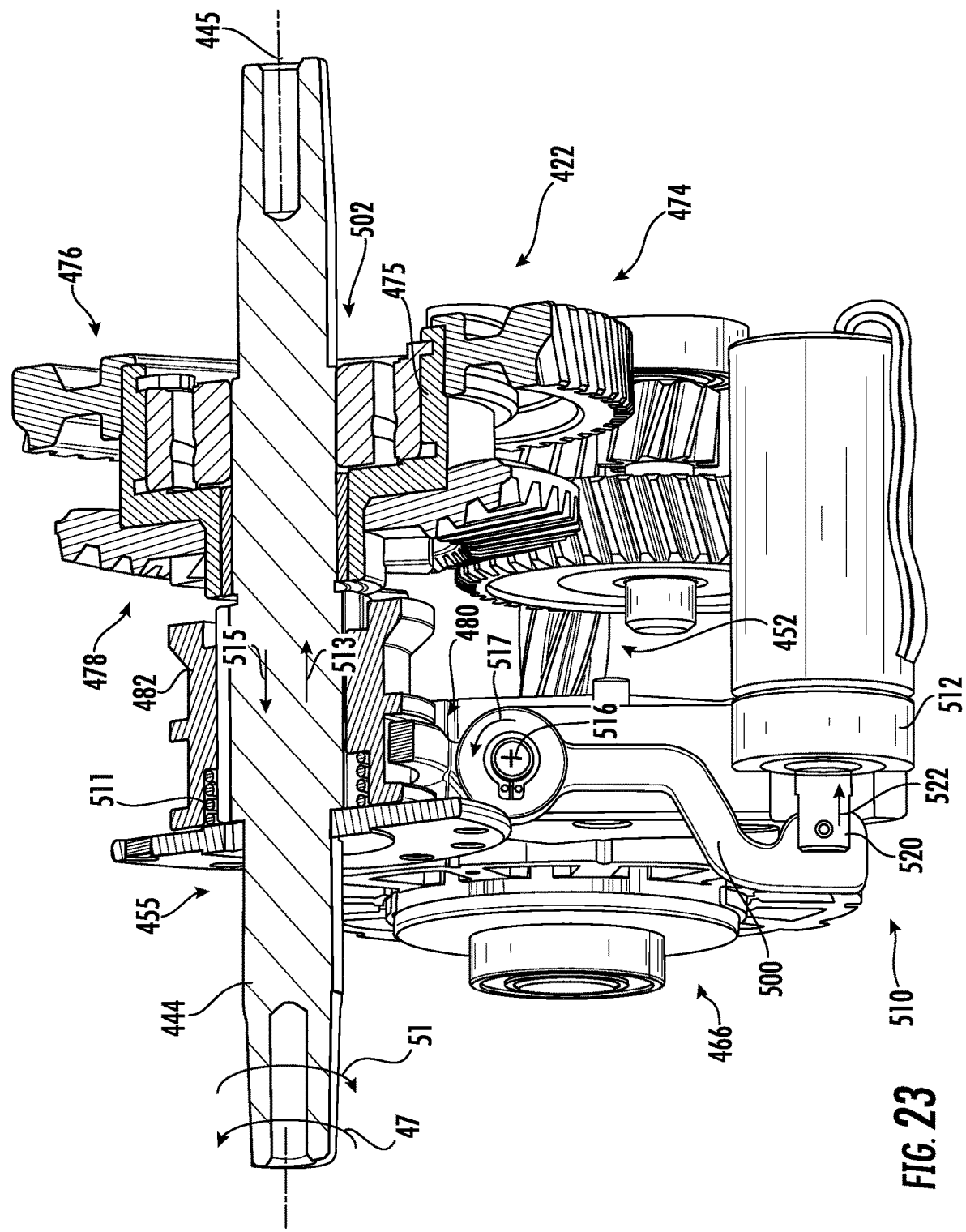
FIG. 23 is a cross-sectional illustration of the pedal drive system of FIG. 21 in an assist mode.
Figure 24:
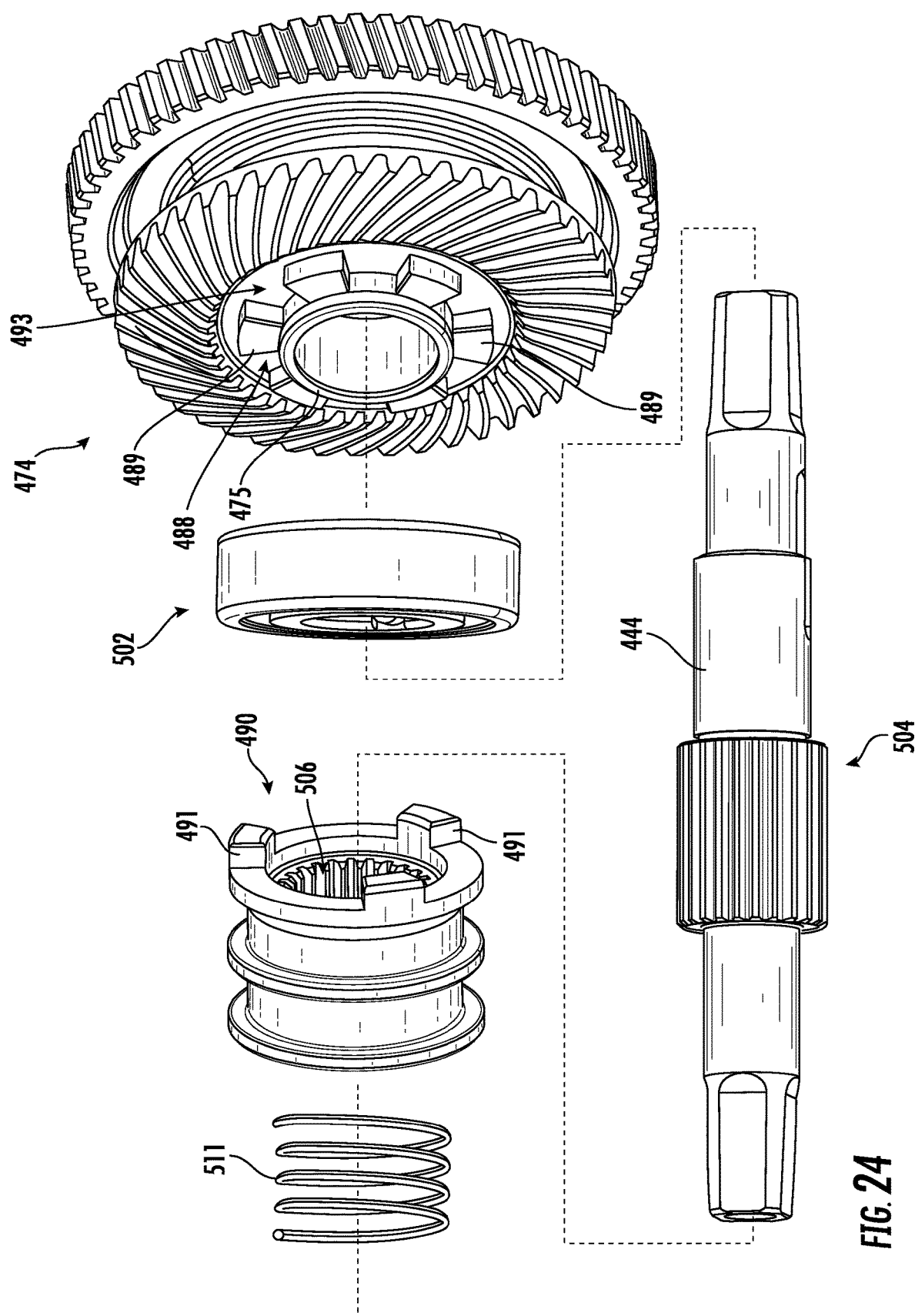
FIG. 24 is an exploded illustration of a part of the coupler arrangement of the pedal drive system of FIG. 21.

FIG. 22 illustrates the pedal drive system 422 in the assist mode. In this mode, the user can drive the thrust unit to generate thrust in only the first thrust direction 49 by pedaling the crankshaft 444 about the crankshaft axis 445. Additionally, the assist drive train 452 is active such that the motor 466 is operably coupled to the thrust unit 470 to assist in driving the thrust unit to generate thrust in the first thrust direction 49. In this mode, the assist drive train 452 prevents backpedaling or back driving of motor 466 as discussed previously.

In this configuration, the coupling arrangement 480, and particularly the coupler 482 have been disconnected from gear 474. Gear 474 in this embodiment is similar to gear 274 and is formed from multiple components. More particularly gear 474 includes a bull gear portion 476 and a bevel gear portion 478 that are coupled together to rotate together in both angular directions about crankshaft axis 445. The bevel gear portion 478 may be considered to be part of the thrust unit 470.

To couple the bull gear portion 476 and bevel gear portion 478, gear 474 includes a hub 475. Bull gear portion 476 and bevel gear portion 478 are operatively coupled to hub 475 such that the components all rotate together. However, in other embodiments, gear 474 could be formed as a single component that provides both bull gear portion 476 and bevel gear portion 478 from a single piece of material.

In the assist mode, the user may drive crankshaft 444 in the first angular direction 47 by pedaling. In the assist mode, a one-way clutch 502 interposed between gear 474 and crankshaft 444 prevents back driving of the assist drive train 452.

In some embodiments, this one-way clutch could allow the assist drive train 452 to overrun the crankshaft 444 such that if the user desires to take a break from pedaling, the motor 466 will continue to drive the thrust unit of the pedal drive system 422 and watercraft.

However, in the typical arrangement, if the user were to stop pedaling, the assist drive train would sense this reduction in pedaling rpm and automatically reduce the output of the assist drive train to match the rate of pedaling/cadence of the operator. With pedaling stopped, the assist drive train would simply stop.

In this arrangement, where the system senses a reduced rate of pedaling and automatically reduces the output of the assist drive train, the user could, once reaching the desired speed, remove its feet from the pedals and the assist drive train will continue at the current rate up to the preset power level. This control can apply to all drive trains described herein.

In the assist mode, a coupling actuator 510 of this embodiment includes an electromechanical coupling actuator in the form of a solenoid 512 that drives a pivot lever 500 about axis 516 in a direction illustrated by arrow 517. This action compresses coil spring 511 to drive coupler 482 out of engagement with gear 474 (illustrated by arrow 515).

By doing this, the coupler 482 no longer rotationally connects the crankshaft 444 to the gear 474. As such, rotational motion of crankshaft 444 by input from the user in either angular direction about crankshaft axis of rotation 445 is not transferred to gear 474 via coupler 482, only by way of one-way clutch 502.

The pivot lever 500 is similar to pivot lever 100 discussed above and includes a forked end that is received in an annular groove in the outer periphery of the coupler 482. The opposed end is coupled to solenoid 512. When solenoid 512 is energized, the armature 520 thereof is retracted (illustrated by arrow 522) causing rotation of pivot arm 500 about axis 516 as illustrated by arrow 517 to drive coupler 482 in the direction illustrated by arrow 515.

To transition to the manual mode, power is removed from solenoid 512. This will allow coil spring 511 to bias the coupler 482 into engagement with gear 474, e.g. illustrated by arrow 513 in FIG. 23. In the assist mode, energization of the solenoid 512 must be maintained to overcome the force of coil spring 511 and keep coupler 482 out of engagement with gear 474.

Figure 25:
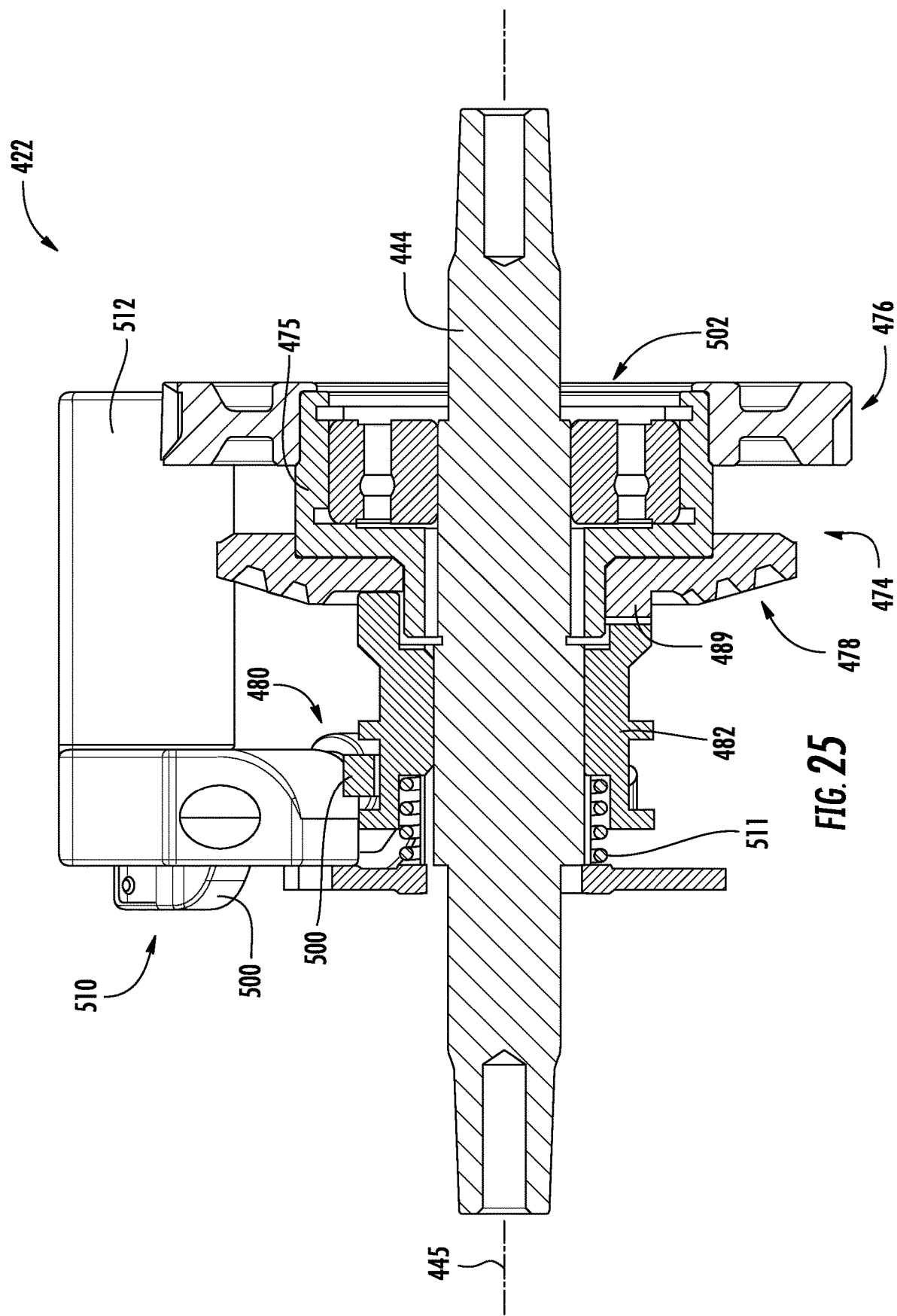
FIG. 25 is a cross-sectional illustration of the pedal drive system of FIG. 21 in the manual mode.

FIG. 25 illustrates the coupler 482 in the manual mode.

The coupler 482 and gear 474 have a torque transfer interface that transfers rotational motion of the coupler 482 to gear 474. With additional reference to FIG. 24, the torque transfer interface includes gear torque transfer arrangement 488 of gear 474 illustrated in the form of a plurality of dogs 489 as well as a coupler torque transfer arrangement 490 illustrated in the form of cooperating dogs 491. These two torque transfer arrangements 488, 490 engage to transfer torque between the coupler and gear 474. More particularly, when in the manual mode, dogs 491 are axially received in channels 493 formed between adjacent dogs 489 of the gear torque transfer arrangement 488. Dogs 489 and 491 may also be referred to as keys.

Coupler 482 includes a second torque transfer interface between the coupler 482 and the crankshaft 444. This torque transfer interface remains engaged in both manual and assist modes. The coupler 482 includes a splined arrangement 506 that engages splined arrangement 504 of the crankshaft 444 that provides the second torque transfer interface. This arrangement, similar to as discussed for previous embodiments, angularly couples the crankshaft 444 and the coupler 482 while allowing the coupler 482 to be driven axially along the crankshaft axis 445 (as illustrated by arrows 513, 515) between the manual and assist modes by coupling actuator 510.

With the coupler 482 in the position illustrated in FIG. 25, the coupler 482 rotationally couples the crankshaft 444 to gear 474 such that rotational motion of the crankshaft in either angular direction 47 or 51 is transferred to gear 474 to drive the thrust unit to output thrust in either thrust direction.

A one-way clutch (not shown in this embodiment) is provided between the motor 466 and gear 474 to prevent back driving the motor 466 which creates unnecessary resistance while pedaling.

Other coupling actuators are contemplated. For instance, a linear actuator or electromagnet such as described above could be incorporated.

This third pedal drive assembly 422 is similar to and/or a combination of pedal drive assembly 22 and pedal drive assembly 222. More specifically, the coupling arrangement 480 of pedal drive assembly 422 uses a similar coupler 482 as coupling arrangement 280 and coupler 282. However, rather than using the electromagnet to drive coupler 482, pedal drive assembly 422 has a coupling actuator 510 similar to coupling actuator 110 of pedal drive assembly 22.

Any of the similar structures of pedal drive assemblies 22 and 222 are thus likewise applicable to pedal drive assembly 422.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pedal drive system for a watercraft, comprising:
   a manual drive train comprising a pair of pedals mechanically attached to a crankshaft for rotation of the crankshaft about a crankshaft axis;
   an assist drive train having a motor;
   a thrust unit;
   a first gear mounted about the crankshaft, the first gear coupled to the thrust unit such that rotation of the first gear in a first angular direction about the crankshaft axis drives the thrust unit to provide thrust in a first thrust direction and rotation of the first gear in a second angular direction about the crankshaft axis drives the thrust unit to provide thrust in a second direction opposite the first direction, the first gear being operably coupled to the motor of the assist drive train such that when activated the motor can drive the first gear in the first angular direction about the crankshaft axis;
   an one-way clutch mounting the first gear to the crankshaft;
   a coupling arrangement having a manual mode and an assist mode, the coupling arrangement including;
   wherein:
      in the assist mode, the one-way clutch permits the first gear to rotate about the crankshaft axis in the first angular direction at a greater speed than the crankshaft; and
      in the manual mode, the coupling arrangement rotationally fixes the crankshaft to the first gear such that rotation of the crankshaft in the first angular direction about the crankshaft axis rotates the first gear in the first angular direction at the same speed as the crankshaft and rotation of the crankshaft in the second angular direction about the crankshaft axis rotates the first gear in the second angular direction at the same speed as the crankshaft.

2. The pedal drive system of claim 1, wherein when the coupling arrangement is in the assist mode, the one-way clutch permits the crankshaft to be backpedaled in the second angular direction opposite the first angular direction while the first gear is driven in the first angular direction about the crankshaft axis by the motor of the assist drive train.

3. The pedal drive system of claim 1, wherein:
   the coupling arrangement includes a coupler;
   in the manual mode, the coupler rotationally couples the crankshaft to the first gear such that rotation of the crankshaft in the first angular direction about the crankshaft axis drives the first gear in the first angular direction and rotation of the crankshaft in the second angular direction about the crankshaft axis drives the first gear in the second angular direction.

4. The pedal drive system of claim 1, wherein:
   the coupling arrangement includes a coupler;
   the coupler is selectively engageable with and disengageable from the first gear;
   in the manual mode, the coupler is engaged with the first gear and rotationally connects the crankshaft to the first gear such that the first gear rotates with the crankshaft when the crankshaft is rotated in both the first and second angular directions;
   in the assist mode, the coupler is disengaged from the first gear such that rotation of the crankshaft in either of the first or second angular directions does not transfer torque to the first gear through the coupler.

5. The pedal drive system of claim 4, wherein the coupler of the coupling arrangement slides parallel to the crankshaft axis to transition between being engaged with the first gear and disengaged with the first gear.

6. The pedal drive system of claim 1, wherein when in the assist mode, the one-way clutch transfers torque from the crankshaft to the first gear when the crankshaft is rotated in the first direction such that power to drive the thrust unit is provided by both the motor and through an external force applied to the crankshaft via the pedals.

7. The pedal drive system of claim 1, wherein when in the assist mode, the one-way clutch only transfers torque to drive the first gear when the crankshaft is rotated in the first direction.

8. The pedal drive system of claim 4, wherein the coupling arrangement includes an electrically powered coupling actuator for transitioning the coupler into or out of engagement with the first gear.

9. The pedal drive system of claim 8, wherein the coupling actuator is an electromagnet.

10. The pedal drive system of claim 8, wherein the coupling actuator includes an electrically power solenoid and a pivoting lever interposed between the solenoid and the coupler.

11. The pedal drive system of claim 4, wherein the coupler is rotationally fixed to the crankshaft in both the assist mode and the manual mode such that the coupler cannot rotate relative to crankshaft in either the first or second angular directions in either the assist mode or the manual mode.

12. The pedal drive system of claim 1, wherein the thrust unit includes a propeller.

13. A pedal drive system for a watercraft, comprising:
   a manual drive train comprising a pair of pedals mechanically attached to a crankshaft for rotation of the crankshaft about a crankshaft axis;
   an assist drive train having a motor;
   a thrust unit;
   a coupling arrangement having a manual mode and an assist mode, the coupling arrangement including a coupler that transitions the coupling arrangement between the manual mode and the assist mode, wherein:
      in the manual mode, the coupler couples the crankshaft to the thrust unit such that rotation of the crankshaft in a first angular direction about the crankshaft axis drives the thrust unit to output thrust in a first thrust direction and rotation of the crankshaft in a second angular direction, opposite the first angular direction, about the crankshaft axis drives the thrust unit to output thrust in a second thrust direction, opposite the first thrust direction;

in the assist mode, the assist drive train is connected to the thrust unit such that when the motor is energized, the assist drive train drives the thrust unit to output thrust in the first thrust direction; and in the assist mode, the coupling arrangement couples the crankshaft to the thrust unit such that rotation of the crankshaft in the first angular direction about the crankshaft axis can drive the thrust unit to output thrust in the first thrust direction and rotation of the crankshaft in the second angular direction about the crankshaft axis does not drive the thrust unit to output thrust in the second thrust direction.

14. The pedal drive system of claim 13, wherein the coupler is engaged with the crankshaft to rotate with the crankshaft about the crankshaft axis when the coupling arrangement is in both the assist mode and manual mode.

15. The pedal drive system of claim 14, wherein:
the thrust unit has a first gear that rotates about the crankshaft axis;
the coupler being selectively engaged with and disengaged from the first gear;
in the manual mode, the coupler is engaged with the first gear and connects the crankshaft to the first gear such that the first gear rotates with the crankshaft when the crankshaft is rotated in both the first and second angular directions;
in the assist mode, the coupler is disengaged from the first gear such that rotation of the crankshaft in either of the first or second angular directions does not transfer torque to the first gear through the coupler.

16. The pedal drive system of claim 15, further comprising a one-way clutch interposed between the first gear and the crankshaft, rotation of the crankshaft in the first angular direction drives the first gear through the one-way clutch and rotation of the crankshaft in the second angular direction does not drive the first gear through the one-way clutch.

17. The pedal drive system of claim 15, wherein the coupling arrangement includes an electromechanical coupling actuator that drives the coupler between first and second positions along the crankshaft axis to transition between the manual mode and the assist mode, the first position corresponds to the coupling arrangement being in the manual mode and the second position corresponds to the assist mode.

18. The pedal drive system of claim 15, wherein:
the coupler has a first axial end face that axially faces the first gear;
the first gear has a second axial end face that axially faces the coupler; further comprising:
a plurality of dogs formed into one of the first and second end faces;
a plurality of dog receiving slots formed into the other one of the first and second end faces sized to axially receive and angularly engage the dogs to transfer torque between the coupler and the first gear when the coupling arrangement is in the manual mode.

19. A watercraft comprising:
a hull; and
a pedal drive system according to claim 1 mounted to the hull.

20. A watercraft comprising:
a hull; and
a pedal drive system according to claim 13 mounted to the hull.

* * * * *